(12) United States Patent
Novotny

(10) Patent No.: US 6,483,962 B1
(45) Date of Patent: Nov. 19, 2002

(54) OPTICAL CROSS CONNECT SWITCHING ARRAY SYSTEM WITH OPTICAL FEEDBACK

(76) Inventor: Vlad J. Novotny, 16105 Cerro Vista Dr., Los Gatos, CA (US) 95032

(*) Notice: Subject to any disclaimer, the term of this patent is extended or adjusted under 35 U.S.C. 154(b) by 0 days.

(21) Appl. No.: 09/865,981

(22) Filed: May 24, 2001

Related U.S. Application Data

(60) Provisional application No. 60/206,744, filed on May 24, 2000, and provisional application No. 60/241,269, filed on Oct. 17, 2000.

(51) Int. Cl.[7] ............................ G02B 6/26; G02B 6/42; G02B 6/35
(52) U.S. Cl. ............................ 385/18; 385/17; 359/224
(58) Field of Search ............... 385/16–23; 359/223–226, 359/290, 291

(56) References Cited

U.S. PATENT DOCUMENTS

| 5,724,123 A | * | 3/1998 | Tanaka | 356/5.01 |
| 5,872,880 A | | 2/1999 | Maynard | 385/88 |
| 6,320,993 B1 | * | 11/2001 | Laor | 385/16 |

OTHER PUBLICATIONS

Bishop, D.J., Giles, C.R., Das, S.R., "The Rise of Optical Switching," Scientific American, pp. 88–94, Jan., 2001.
Blumenthal, D.J., "Routing Packets With Light," Scientific American, pp. 96–99, Jan., 2001.
Ehrfeld, W. and Bauer, HD, "Application of Micro–and Nanotechnologies for the Fabrication of Optical Devices," SPIE, vol. 3276, pp. 2–14, 1998.
Grade, J.D., and Jerman, H., "A Large–Deflection Electrostatic Actuator for Optical Switching Applications," Presented at Hilton Head 2000, pp. 1–4, 2000.
Laor, H., "Construction and Performance of a 576x576 Single–Stage OXC," LEOS, 3 pages, Nov. 8, 1999.
Laor, H., Fontenot, E., Richards A., D'Entremont, J., Hudson, M., Krozier, D., "Performance of a 576x576 Optical Cross Connect," NFOEC, pp. 1–5, Sep. 26, 1999.

* cited by examiner

Primary Examiner—John D. Lee
Assistant Examiner—Scott Knauss

(57) ABSTRACT

An optical cross connect switch directs an optical data signal from an incoming optical fiber in a first fiber array to a first controllable mirror in a first controllable mirror array, a second controllable mirror in a second controllable mirror array into an outgoing optical fiber in a second fiber array. A position sensing detector array determines the position of the light with respect to fiber cores to provide feedback control to the controllable mirror arrays.

61 Claims, 15 Drawing Sheets

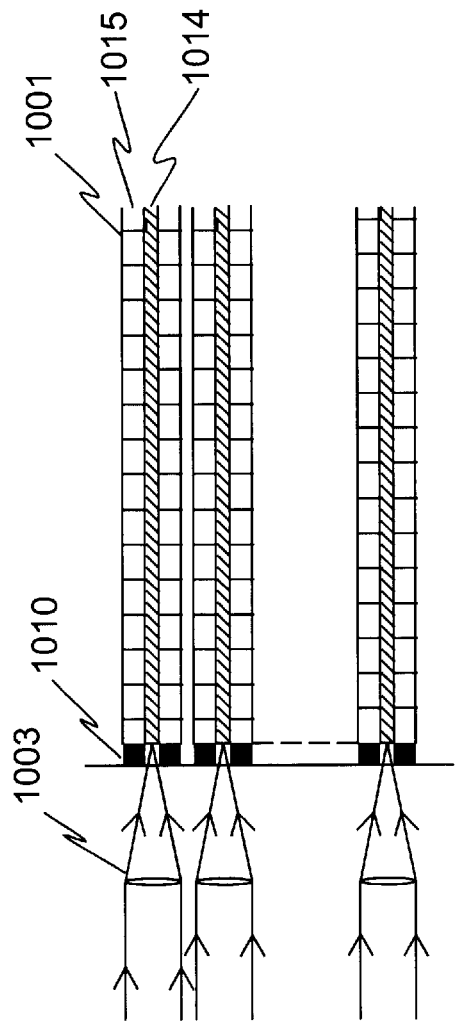
Figure 10(a):
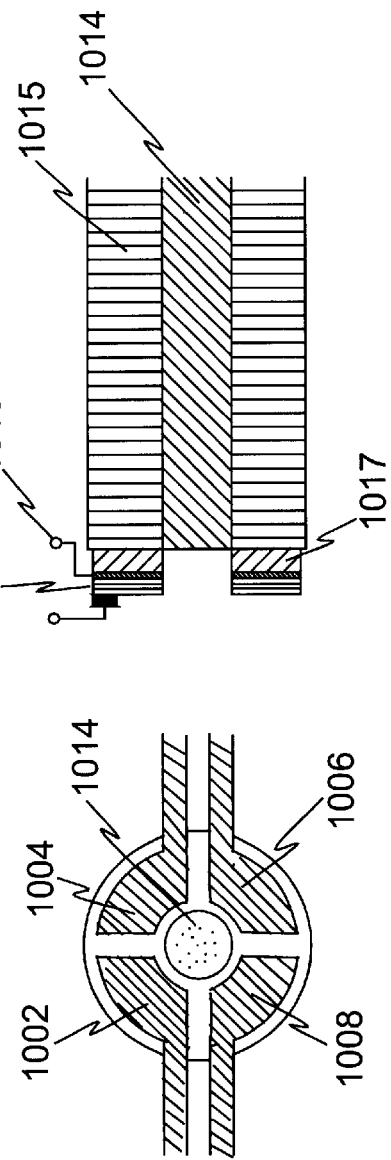
Figure 10(c):
Figure 10(b):

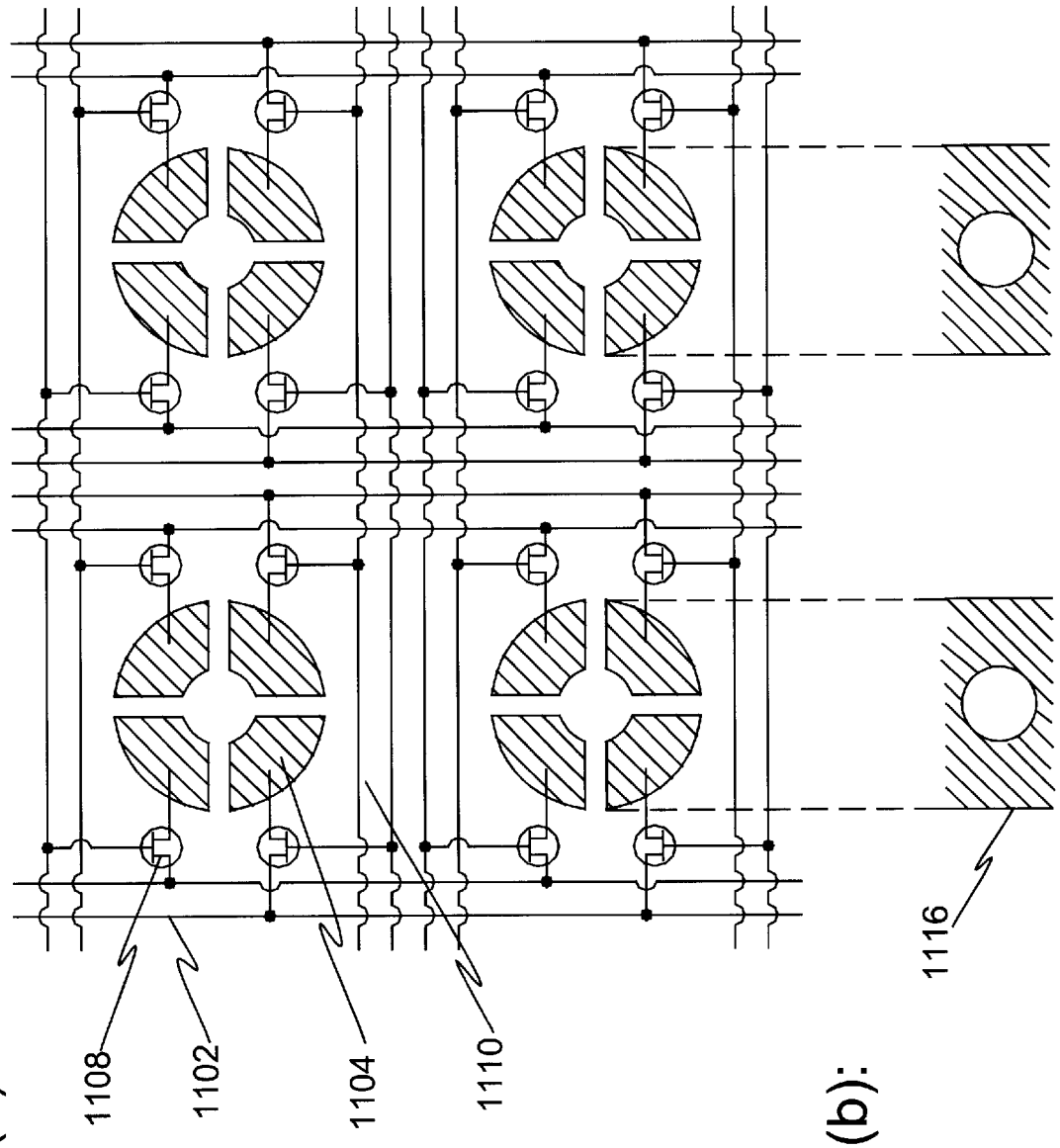

OPTICAL CROSS CONNECT SWITCHING ARRAY SYSTEM WITH OPTICAL FEEDBACK

RELATED APPLICATION

This application claims priority under 35 U.S.C. §119(e) from U.S. patent application Ser. No. 60/206,744, entitled, "Optical Cross Connect Switching Array Systems With Optical Feedback Control," by Vlad Novotny, filed May 24, 2000, which is incorporated by reference in its entirety. This application also claims priority under 35 U.S.C. §119(e) from U.S. patent application Ser. No. 60/241,269, entitled, "Micro-Electro-Mechanical Systems For Optical Switches and Wavelength Routers," by Vlad Novotny and Parvinder Dhillon, filed Oct. 17, 2000, which is incorporated by reference in its entirety.

BACKGROUND

A. Technical Field

The present invention relates generally to networking systems, and more particularly to optical cross connect switching in optical networks.

B. Background of the Invention

As the result of continuous advances in technology, particularly in the area of networking such as the Internet, there is an increasing demand for communications bandwidth. For example, the transmission of data over a telephone company's trunk lines, the transmission of images or video over the Internet, the transfer of large amounts of data as might be required in transaction processing, or videoconferencing implemented over a public telephone network typically require the high speed transmission of large amounts of data. As applications such as these become more prevalent, the demand for communications bandwidth capacity will only increase.

Optical fiber is a transmission medium that is well suited to meet this increasing demand. Optical fiber has an inherent bandwidth that is much greater than metal-based conductors, such as twisted pair or coaxial cable; and protocols such as the SONET optical carrier (OC) protocols have been developed for the transmission of data over optical fibers.

Optical fiber is used to form optical networks that carry data, voice and video over optical fibers using multiple wavelengths of light in parallel. Light is routed through the network from its originating location to its final destination. Since optical networks do not generally have a single continuous optical fiber path from every source to every destination, the light is switched as it travels through the optical network. Previously, this switching was accomplished using optical-electrical-optical ("OEO") systems, where the light signal was converted to an electrical signal, switched electrically, then output optically.

However, because in OEO systems the signal must be converted from optical to electrical, switched, then converted back to optical, the OEO systems were relatively large, complex, and expensive. More seriously, the electrical systems have slower performance than optical systems. This means that use of an OEO system creates a bottleneck in the optical network, and an OEO system is undesirable.

Much effort is being expended on the development of an all-optical cross-connect switching system, using a variety of different technological approaches: movable mirrors, acousto-optic diffraction, electro-optic refraction, magneto-optic switching, movable bubbles, and liquid crystal addressable arrays to name a few. Each of these technologies has its own performance characteristics, advantages and disadvantages.

Also, at times an optical cross connect switch resides at nodes in a ring-mesh network and light signals received at the node may be of widely varying intensity. It is typically desirable to equalize the intensity of the signals before they are amplified or routed to another node.

Thus, what is needed is an optical cross connect switching system to switch optical signals in the optical domain, without converting the optical signals to electrical signals. The system preferably should also have the capability to equalize the intensity of the signals.

SUMMARY OF THE INVENTION

The present invention is an optical cross connect switching system. In one embodiment, a first optical fiber array carries optical destination signals and optical data signals. A switch configuration controller demultiplexes, converts optical signals to electrical signals and decodes the optical destinations for the optical data signals. A first mirror array controllably reflects the optical data signals from outputs of the first optical fiber-lens array. A second mirror array controllably reflects the optical data signals from the first mirror array. A second optical fiber-lens array receives the optical data signals reflected from the second mirror array. A position detector array detects the position of the optical data signals reflected from the second mirror array. A switch configuration controller uses the decoded optical destination signals and the detected position of the optical data signals to control the first and second mirror arrays to correctly direct the optical data signals from the first optical fiber array to the second optical fiber array.

BRIEF DESCRIPTION OF DRAWINGS

FIGS. 10(a), 10(b) and 10(c) illustrate another embodiment of a position sensitive detector array.

FIGS. 11(a) and 11(b) illustrate electrical lead interconnects for large photodetector arrays.

DETAILED DESCRIPTION OF THE PREFERRED EMBODIMENTS

Embodiments of the present invention are now described. In general, a light beam from any incoming fiber is switched to any outgoing fiber with minimum light intensity loss and minimum crosstalk.

System Overview:

An optical cross connect switch system switches an optical signal carried by a light beam from any incoming fiber to any outgoing fiber. For clarity, some of the figures and description portray the data as traveling one way from incoming fibers to outgoing fibers. However, it should be understood that data travel can also be bidirectional. In a bidirectional switch, data travels both ways through the switch, with each fiber acting as both an incoming fiber and as an outgoing fiber, although not at the same time. To accomplish this, the system has symmetrical functionality, with some elements of the switching system that are described and shown as on only one side (incoming or outgoing) actually having duplicate counterparts (not shown) on the other side.

If there are N incoming fiber lines and M outgoing fiber lines, the optical cross connect switch is referred to as an N×M switch. For short haul applications, N and M are less than 32. For long haul applications, N and M are generally each in the range from 1024 to 4096.

Figure 1:
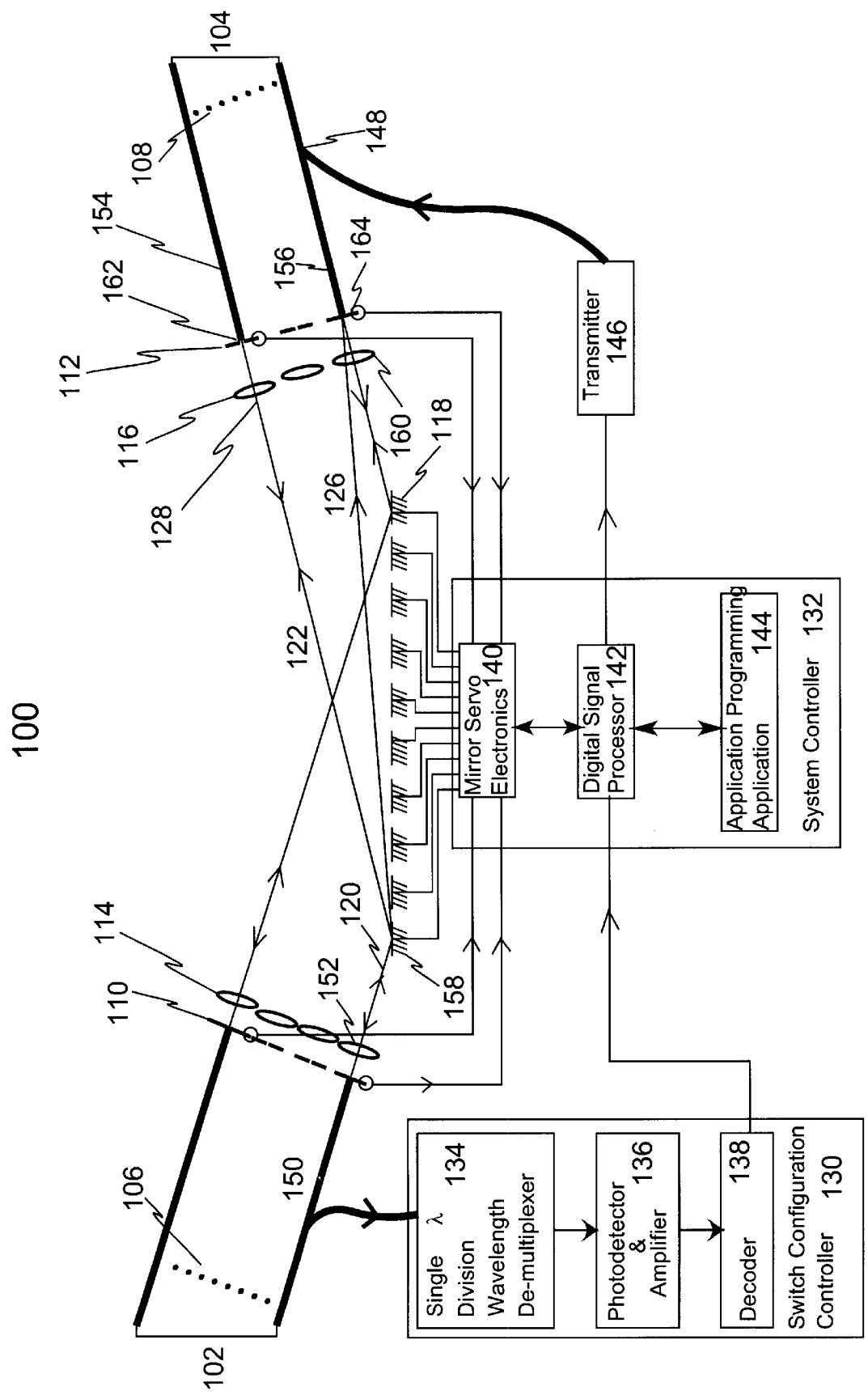
FIG. 1 is a diagram showing an overview of an N×M optical cross connect switching array system.

FIG. 1 is a diagram showing an overview of an N×M bidirectional optical cross connect switching array system 100. The system 100 comprises the following building blocks:

1. Arrays of fibers 102 and 104 with their respective alignment structures 106 and 108.
2. Lens arrays 114 and 116, which are used to collimate the outgoing light beams and increase coupling efficiency of incoming light beams. Typically, the lens arrays 114 and 116 collimate light exiting from the fibers and focus light entering the fibers.
3. Position sensitive detector arrays 110 and 112 for sensing the position of the light beams entering into fibers.
4. A mirror array 118 to direct the light beam from any incoming fiber to any outgoing fiber.
5. Servo electronics 140 to control deflection of mirrors in the mirror array 118, which directs light beams to selected destinations, aligns light beams onto the outgoing fibers, and maintains optimum positioning of the light beams.
6. A switch configuration controller 130 comprising a single channel demultiplexer 134, a photodetector and amplifier 136 and a decoder 138 to determine the destination for the light from each fiber, used to dynamically control the cross connect switch 100 configuration.
7. Fiber splitters coupled to photodetectors to monitor intensities of light coupled into each fiber (not shown in FIG. 1).
8. A system controller 132, in this case comprising a digital signal processor 142, application programming interface 144, and the mirror servo electronics 140 to control the mirror array 118.

The following description addresses the switching of a light beam from one of the fibers 150 in array 102 to fibers in array 104. However, the description is equally applicable to switching a light beam between any fiber in array 102 to any fiber in array 104, or from any fiber in array 104 to any fiber in array 102.

A beam of light 120 is carried on a given individual incoming fiber 150 in the incoming fiber array 102. The beam of light 120 is capable of containing multiple parallel streams of optical data signals at multiple wavelengths. The beam of light 120 is also capable of containing streams of optical destination signals carrying information identifying the destination for each optical data signal within the beam.

In this example, the optical destination signal contains instructions on routing of data signals and configuration of the whole switching array. The optical destination signal is carried on one data channel in one selected incoming fiber 150. The light beam on the selected incoming fiber 150 is split. One part is sent to the switch configuration controller 130, which interprets the instructions on the routing of data. Within the switch configuration controller 130, a single channel wavelength division demultiplexer 134 selects the channel containing the instructions. A photodetector with amplifier 136 converts the optical signals into electrical signals that are decoded by decoder 138. The decoded signal provides information for the proper configuration of the switch system 100. In one embodiment, the single channel demultiplexer 134 is a Fiber Bragg grating. Other demultiplexers are used in other embodiments. In a preferred embodiment, the system 100 is one node in a larger network with a mesh or mesh-ring type architecture. In this case, wavelength division demultiplexer 134 is generally required only on one side but for redundancy reasons can be included on the "outgoing" side also. Decoded signals are fed into digital signal processor 142 within the switch configuration controller 132 that provides instructions to servo electronics 140. The servo electronics 140 then position the mirrors in the mirror array 118 to correctly route the data signals. In alternate embodiments, the instructions for routing data may be obtained in other manners, for example by providing configuration instructions electrically, using electrical communication between nodes of the cross connect switching system. Also, in some embodiments, the system controller 132 includes an application programming interface 144 for controlling and monitoring performance of the whole cross connect switching system.

The beam of light 120 exits the fiber 150 in a diverging manner. Beam 120 is collimated with lens 152 so that the beam propagates without significant divergence to a first mirror 158 in the mirror array 118. The first mirror 158 has been positioned by the mirror servo electronics 140 to direct the beam of light along a first optical path 122 to the second lens 128 in the second lens array 116. The second lens 128 focuses and couples most of the light 120 into the outgoing fiber 154 in the outgoing fiber array 104. This way, minimum optical energy is lost as the light passes through the switching system 100 and insertion losses are minimized.

Position sensitive detector 162 within the position sensitive detector array 112 detects the position of the light beam entering the outgoing fiber 154. The position sensitive detector 162 provides signals that indicate the position of the light beam 120 with respect to the core of the outgoing fiber 154 in the outgoing fiber array 104. In some embodiments, the position detectors detect the light beams that carry the optical data signals. In other embodiments, the position detectors detect registration light beams that have a different wavelength than the light beams that carry the optical data signals, but which propagate along the identical optical path as the light beams that carry the optical data signals. The position detectors generate a feedback signal that drives the servo electronics for each set of two mirrors, provides the initial alignment after switching and maintains this alignment continuously and dynamically until the instructions for reconfiguration are received through demultiplexer-receiver system. Embodiments of position sensing devices, such as bilateral photodetectors, quadrant photodetectors, charge coupled device imaging arrays, complementary metal oxide semiconductor device imaging arrays, or infrared imaging arrays, are placed in several alternative locations in alternative embodiments to act as the position sensitive detector arrays 112 and 110 and generate position error feedback signals for the system controller 132 that controls mirror positioning.

For maximum light to enter the outgoing optical fiber, the light beam 120 is positioned over the core of the outgoing optical fiber 154. Deviation of the light beam 120 from the optimized position over the core of fiber 154 causes a deviation in the feedback signal that is generated by the position sensitive detector array 112 and fed into the switch configuration controller 132. The mirror servo electronics 140 within the system controller receives the feedback signal and in response controls the deflection of the mirror 158 to align the light beam 120 into the outgoing fiber 154. FIG. 1 shows the position sensitive array 112 as being directly in front of the outgoing fiber array 104. However, in other embodiments, the position sensitive array 112 is placed in alternate locations in the optical cross connect switching system 100.

In this embodiment, the digital signal processor 142 generates a new destination signal or other signal to provide information on the status of the optical cross connect switching system 100. This signal is sent on a selected fiber in the outgoing fiber array 104 to other switches at other nodes of the network or to a network manager. This signal allows proper switching at other switches on the network. The digital signal processor 142 sends this signal to the transmitter 146, which converts the signal to an optical signal. The transmitter 146 then couples the optical destination signal to the one selected outgoing fiber in the outgoing fiber array 104 via a multiplexer 148.

When light beam 120 is to be switched into a second outgoing fiber 156, the switch configuration controller 130 receives a destination signal identifying the new destination outgoing fiber 156. The switch configuration controller 130 sends the new destination to the system controller 132, which repositions the mirror 158 in the mirror array 118 so that beam 120 follows the optical path 126 to the lens 160 in the second lens array 116. The lens 160 focuses and couples most of the light 120 into the outgoing fiber 156 in the outgoing fiber array 104, using feedback from the position sensitive array 112 as described above.

In a similar manner, the light beam 120 can be directed to any outgoing fiber in the outgoing fiber array 104. The switch configuration controller 130 determines the destination for light carried by all the incoming fibers. The system controller 132 controls the deflection of the mirrors in the mirror array 118 to direct the light to the destination outgoing fiber. The position sensitive detectors in the position sensitive array 112 provide feedback to optimally position the light beam over the core of the outgoing fiber.

In bidirectional embodiments, light beams also travel from the outgoing fibers in the outgoing fiber array 104 to incoming fibers in the incoming fiber array 102. This is done in the same way as light beams traveling from incoming fibers in the incoming fiber array 102 to outgoing fibers in the outgoing fiber array 104. The switch configuration controller 130 receives the optical destination signal from the fibers 104, the system controller 132 positions the mirrors in the mirror array 118 to direct the light beams to the appropriate fibers 102, and the position sensitive array 110 provides feedback to optimally position the light beam over the core of the fibers 102.

The fiber arrays 102 and 104, alignment structures 106 and 108, position sensitive detector arrays 110 and 112, lens arrays 114 and 116, and mirror array 118 are shown as one-dimensional in the embodiment of FIG. 1 for clarity. In preferred embodiments, the arrays are two-dimensional. For example, in an embodiment with a two-dimensional mirror array 118, there are rows and columns, or some other two-dimensional arrangement of mirrors. The other arrays and alignment structures are similarly two-dimensional in some embodiments. In addition, the overall system is shown as two-dimensional in FIG. 1. In preferred embodiments, the system is three-dimensional, as the additional dimension in and out of the plane of the paper can be advantageously used to position the various components.

The feedback from the position sensitive arrays 112 can also be used to intentionally and controllably misalign a light beam with respect to the core of its outgoing fiber. In this way, attenuation is introduced. The attenuation can be set to different levels, using the feedback to maintain the attenuation at the desired level. If the mirror array 118 is used simply to vary this attenuation but not to switch between fibers, then the result is a variable optical attenuator (VOA). If both the switching and variable attenuation capabilities are utilized, the result is an optical switch with equalization.

Figure 2:
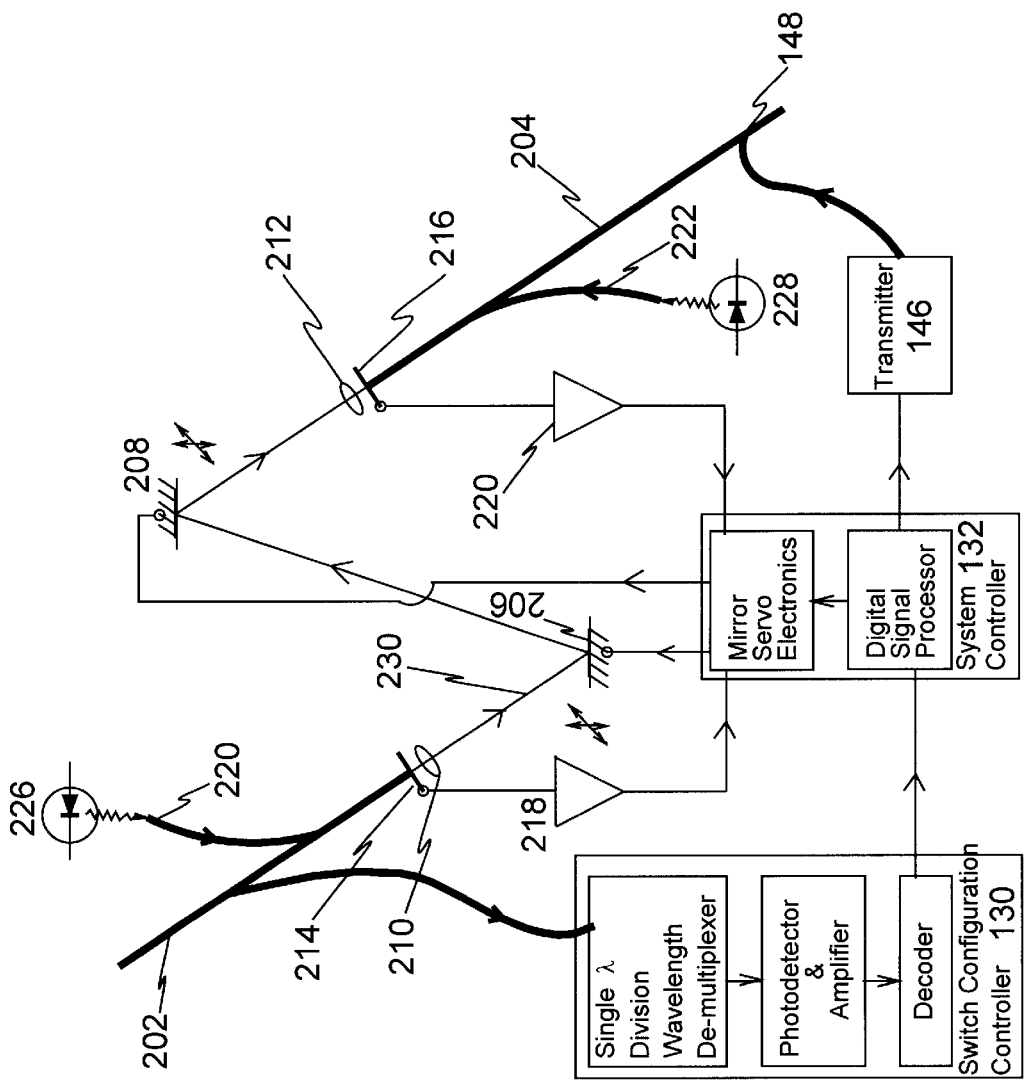
FIG. 2 shows a portion of another embodiment of an optical cross connect switching system that uses two mirror arrays.
Figure 3:
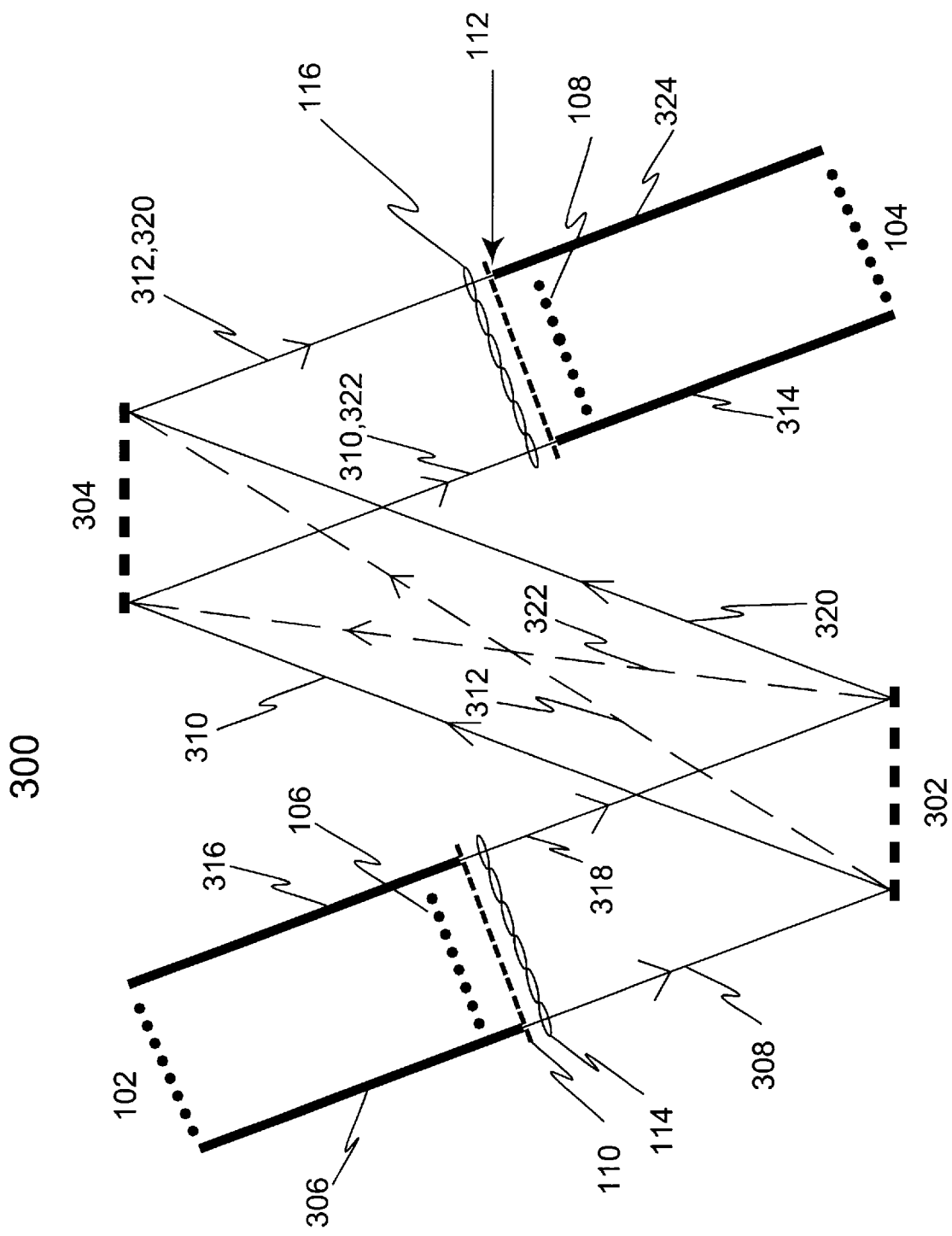
FIG. 3 shows more detail for the optical cross connect switch of FIG. 2.

FIGS. 2 and 3 show other embodiments of an optical cross connect switching system 200 that uses two mirror arrays. By using two mirror arrays, the optical cross connect switching system 200 of FIGS. 2 and 3 directs a light beam from any incoming fiber into any outgoing fiber with optimal light coupling. By using appropriate deflections of the mirrors in the mirror arrays, the central ray of the light beam impinges any of the outgoing fibers in parallel with the fiber axis.

In addition, FIG. 2 illustrates the use of registration beams, generated by sources 226 and 228 respectively, for position sensing and feedback.

For simplicity, only one incoming fiber 202, one outgoing fiber 204, the fibers' associated lenses 210 and 212 and position sensitive detectors 214 and 216, one mirror 206 in the first mirror array, and one mirror 208 in the second mirror array are depicted in FIG. 2. It is to be understood that the principles illustrated are also applicable to arrays, as described with respect to FIG. 1. FIG. 3 shows a system 200 based on these principles but using arrays of devices. However, FIG. 3 is simplified to clearly show the paths of the light beams.

FIG. 2 illustrates a light beam 230 traveling from incoming fiber 202 to outgoing fiber 204. In FIG. 2, the data light beam 230 exits from the incoming fiber 202 and is collimated by lens 210 to propagate to the outgoing lens 212 without significant divergence. Initially, data light beam 230 is directed to the mirror 206 that in turn directs the beam onto the mirror 208. The mirror 208 is chosen because it is the mirror that is aligned to allow the central axis of the light beam 230 to travel a path to the outgoing fiber 204 that is parallel with the axis of the outgoing fiber 204. Mirror 208 is angled to a position to reflect the light beam 230 toward the outgoing fiber 204 along the path that is parallel with the axis of the outgoing fiber 204. The lens 212 focuses data beam 230 onto the core of outgoing fiber 204. The fibers 202 and 204, lenses 214 and 212 and mirrors 206 and 208 are positioned so that the data beam 230 is coarsely positioned onto outgoing fiber 204 or in its vicinity. The fine positioning of the outgoing data beam 230 onto the core of the fiber 204 is accomplished with the position sensitive detector 216 and mirror servo electronics 140. The position sensitive detector 216 generates position error signals in two directions and these two signals are amplified with amplifiers 220, processed to determine two position errors and fed into the servo electronics 140 that provides closed loop control of position, as is well known to those skilled in the art of the feedback servo control. Feedback from the detector 216 is used to control both mirror 208 and mirror 206. In one embodiment, the mirror deflection angles are correlated and they are moved as a couple with substantially identical deflection angles. This provides the advantages of coupling the maximum light intensity into the outgoing fiber 204 and minimizing optical insertion losses.

In addition, fiber 220 in FIG. 2 is included to provide alternative registration light source at wavelength $\lambda_s$ that is different than data wavelengths $\lambda_1 \ldots \lambda_n$. The registration light source at wavelength $\lambda_s$ is coupled to the incoming fiber. Thus, the registration light travels the same path as the wavelengths carrying the data signals. Consequently, the position sensitive detector 216 can detect the position of either the data signals or the registration light signal at wavelength $\lambda_s$. When data beams are used for position sensing, the position sensitive detector 216 has high sensitivity at infrared communication wavelengths. Such position sensitive detectors are typically more expensive that detectors that operate at shorter wavelength. Consequently, it may be less expensive to include registration light beam with wavelength $\lambda_s$. In this case, detectors 216 are selected with high sensitivity at wavelength $\lambda_s$.

The optical cross connect switching system in FIG. 2 is bi-directional. At one time period, the data traffic flows from fiber 202 to the fiber 204. At another time period, traffic flows in the opposite direction, i.e. from fiber 204 to fiber 202. Consequently, additional devices are included in the system. The position sensitive detector 214 and amplifier 218 are additional devices included in the system to allow bi-directional data flow. The position sensitive detector 214 and amplifier 218 play the same role for traffic from fiber 204 into fiber 202 as components 216 and 220 do for traffic from fiber 202 into fiber 204. Similarly, registration light source 228 and fiber 222 are additional devices included in the system to allow bidirectional data flow. The function of registration light source 228 and its fiber 222 is the same as light source 226 and fiber 220 except that registration light source 228 and its fiber 222 are active when traffic travels from fiber 204 to fiber 202. Switch configuration controller 130 and system controller 132 operate in the same manner as in FIG. 1.

FIG. 3 shows more details of the optical cross connect switch 200 of FIG. 2. This figure also demonstrates how the two mirrors 206 and 208 in FIG. 2 and two sets of mirrors 302 and 304 in FIG. 3 direct the light from any incoming fiber to any outgoing fiber at an angle at which the central axis of light incident onto the outgoing fiber is substantially parallel with the outgoing fiber axis. Moreover, FIG. 3 clarifies how the switch 200 works with arrays of fibers and mirrors, and sends a light beam from any incoming fiber to any outgoing fiber. Thus, FIG. 3 includes the multiple incoming and outgoing fibers and multiple mirrors in the two mirror arrays.

When light 308 from fiber 306 is supposed to be directed into fiber 314, beam 308 is collimated with lens 338 in lens array 114, reflected from mirror 330 in mirror array 302 to follow path 310 onto mirror 334 in mirror array 304 and from mirror 334 onto lens 342 in lens array 116 that focuses the light into fiber 314. When light 308 from fiber 306 is to be switched to fiber 324, mirror 330 is deflected so that the light beam 308 follows path 312 and travels to mirror 336 in mirror array 304 and then, after appropriate deflection from mirror 336 it travels along path 312 to lens 334 in lens array 116 and fiber 324. With the two mirror arrangement, central rays of the light beam 308 are directed to follow optical paths, such as paths 310 and 312, from any incoming fiber to any outgoing fiber that are parallel with the axes of outgoing fibers 314 to 324. This allows the beam 308 to couple into the outgoing fiber with minimum insertion losses. If the light beam 308 drifts from the optimized position on cores of the outgoing fibers, position sensitive detectors in the position sensitive detector array 112 provide a position error signal to servo electronics that corrects position of mirrors in mirror arrays 302 and 304.

Previous description outlined the architecture of the system and how the system works. A detailed description of components follows.

Figures 4A, 4B, 4C:
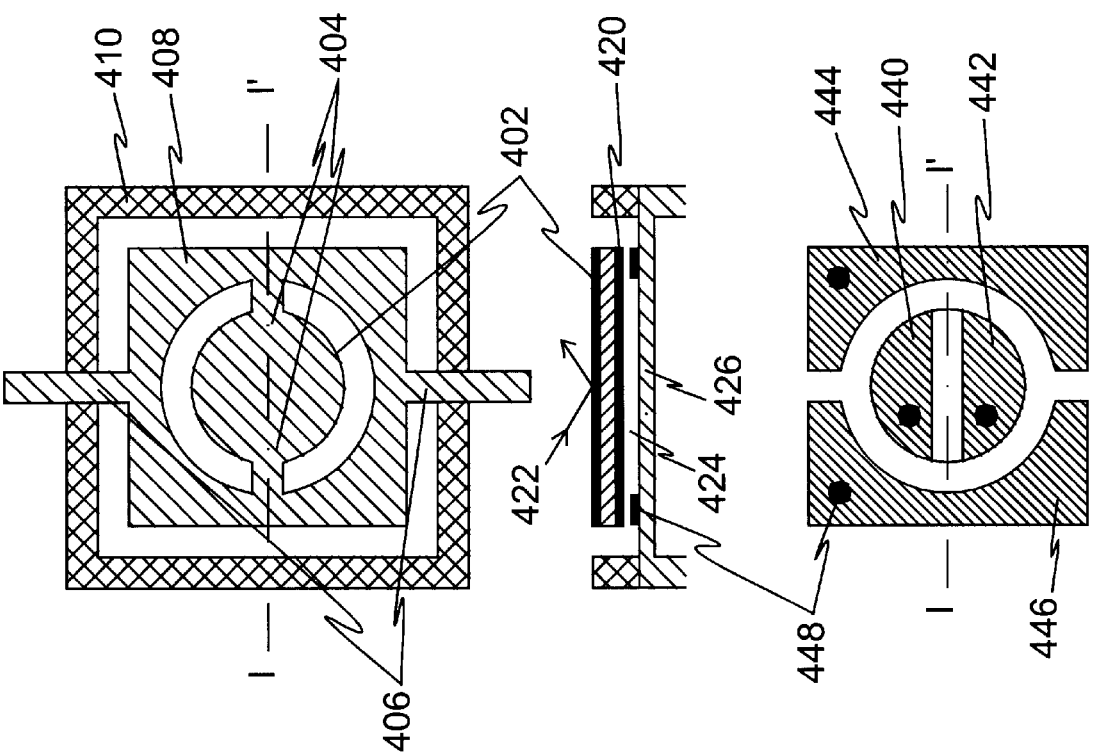
FIGS. 4(a) through 4(c) show one embodiment of a controllable MEMS mirror system.

Mirror Arrays:

Mirror arrays can be either one- or two-dimensional, depending on whether the fiber array is one- or two-dimensional. Typically, smaller fiber arrays are one-dimensional, and large systems are two-dimensional. A diagram of one mirror from the mirror array is shown in FIGS. 4(a) through 4(c). The mirrors themselves preferably tilt in two directions in order to switch the light between outgoing fibers and to make two-directional rotational corrections of the position of a light beam with respect to a core of optical fiber. In this case, the first set of hinges 404 allows rotation around the first axis and the second set of hinges 406 permits rotation around a second axis that is perpendicular to the first axis. The mirrors preferably use two-directional actuators (i.e., actuators which permit the mirror to tilt in both the positive and negative direction with respect to an axis) in order to accomplish the full two-directional rotation correction. In alternate embodiments, one-directional actuators are used instead of two-directional actuators. One-directional actuators provide a mirror that tilts on only a single axis in a positive or a negative direction. In these alternative embodiments, four one-directional mirror arrays are used rather than the two two-directional mirror arrays shown in FIG. 3.

Several different technologies for driving and fabricating the mirror arrays and controlling the deflections of the mirrors in the arrays are employed in different embodiments. Driving technologies include electrostatic, electromagnetic, piezoelectric, thermally activated mirrors, and other types of driving technologies. One embodiment is based on two-directional, macroscopic electromagnetic galvanometer actuators fabricated with discrete mirrors, coils and magnets such as those used in optical recording drives. Two independent electric currents pass through two separate current loops, and two sets of magnetic fields are applied so that the current, magnetic field and resulting torque vectors are all perpendicular to each other. Electromagnetic galvanometer mirrors fabricated with multiple electrical turns around the mirror and the inner frame and two sets of magnets represent one implementation of two-dimensional rotating actuator. In other embodiments, the mirror arrays are Micro Electro Mechanical Systems (MEMS), which provide improved performance and low cost.

FIGS. 4(a) through 4(c) show one embodiment of a controllable MEMS mirror system 400, controlled by electrostatic driving technology. FIG. 4(a) shows a top view, FIG. 4(b) shows a side view, and FIG. 4(c) shows a bottom view. The MEMS mirror system 400 includes a mirror 402.

In the embodiment illustrated in FIGS. 4(a)–4(c), the mirror has a circular shape. In other embodiments, the mirror 402 is rectangular or of another shape. As seen in FIG. 4(a), the MEMS mirror system 400 has two sets of hinges 404 and 406 that are placed perpendicularly to each other so that each hinge pair allows angular deflection around their respective axes. The outer set of hinges 406 allows one directional rotation of the inner frame 408 with respect to the outer frame 410. The inner set of hinges 404 allows one directional rotation of the mirror 402 with respect to the inner frame around axis that is perpendicular to the outer rotation axis.

The length, width, thickness and cross sectional shape of hinges determine the stiffness and consequently the voltages required to achieve desired deflections. The hinge stiffness is proportional to the hinge width and the third power of hinge thickness and inversely proportional to hinge length. The hinge thickness is optimized so that the stiffness is minimized but the structure is not too fragile so that it would not survive separation after fabrication, handling during assembly and shock and vibration in typical environment. In some embodiments, the hinges are single, double, triple or quadruple serpentine hinges. This provides the advantage of allowing relatively narrow hinge width and long hinge length to minimize stiffness.

The reflecting surface of the mirror 402 is covered with materials that have very high reflectivity in the operating wavelength range. For optical communications, the operating range is usually from 900 to 1600 nm. Most metal films have higher than 95% reflectivity in this range, and with two reflections, 90% of the signal is preserved. In one embodiment, gold film is the material used because it has 99%+ reflectivity at optical communication wavelengths and long-term stability due to its resistance to corrosion and other degradation.

The mirror 402 and inner frame 408 are made of electrically conducting material (e.g. doped silicon) or of nonconducting material (e.g. undoped silicon) that is coated with electrically conducting film on the bottom side (light 422 is reflected from the top side of mirror 402). This bottom conductive side is connected to a common electrode 420 that is typically kept at ground. Film material and thickness on the top and bottom of the mirror and inner frame are typically substantially the same in order to avoid distorting the mirror by differential stress. Cr, Ta, Ti, and other metals are used below the optically reflecting film to improve adhesion of metals such as Au to the mirror surfaces. The driving electrode structure is defined below the mirror with an air gap 424 that is adjusted according to mirror dimensions, desired deflection angles, torque constants of hinges and voltages planned for full deflections (typically equal to 30% of the air gap between two plates of parallel capacitor to avoid snapping instability of the mirrors). As seen in FIG. 4(c), driving electrodes are divided into four segments 440, 442, 444 and 446, with two segments controlling deflections in one direction. The segments are in pairs, the first pair being segments 440 and 442, and the second pair being 444 and 446. The 440–442 pair is used to tilt the mirror 402 about the hinge 404. Applying a voltage to one segment 440, while keeping the other segment 442 and top electrode 420 at ground, tilts the mirror 402 so that the gap between electrode 440 and mirror 402 is decreased. Applying a voltage to the other segment 442, while keeping segment 440 and top electrode 420 at ground, tilts the mirror 402 in such a way that the gap between electrode 442 and moving mirror is decreased. Inner frame 408 is tilted in the same manner, using segments 444 and 446.

Four fixed electrodes 440, 442, 444 and 446 together with movable mirror 402 and movable inner frame 408 form four parallel plate capacitors. In other words, mirror 402 and inner frame 408 are part of the common movable electrode that is typically held at ground. Based on the position of the light with respect to the outgoing fiber, a voltage difference Vij1 is applied to electrode 440 to obtain a deflection αij1 of the mirror around a first axis. A voltage difference Vij2 is applied to the electrode 444 in order to obtain a deflection αij2 of the mirror around a second axis. The indices i and j represent the row and the column of the mirror in the mirror array, respectively. In embodiments with two mirror arrays, such as shown in FIGS. 2 and 3, another pair of voltages, Vkl1 and Vkl2 is applied to two electrodes of a second mirror actuator in the second mirror array. The pair of voltages Vkl1 and Vkl2 provides deflections βkl1 and βkl2 in the second mirror. In one embodiment, typically αij1 is substantially equal to βkl1 and αij2 is substantially equal to βkl2.

In some embodiments, the actuators are two-directional electrostatic rotational comb actuators. One such rotational comb actuator is described below with respect to FIG. 15. In electrostatic rotational comb actuators, rotational motion is generated by attractive forces between oppositely charged combs of an edge capacitor. Two sets of hinges are employed to provide rotational motion in two directions. Up to six leads connect electrical voltage sources with combs. For large arrays, leads are routed along the walls of the top wafer onto the lower wafer that contains driving electronics. Rotational comb designs have leads incorporated on movable electrodes and no bottom electrodes are required. The leads are brought along the walls toward the bottom wafer that contains driving electronics. The interconnections between the top and bottom wafers are fabricated with solder reflow.

In embodiments with large arrays, the electrodes preferably are addressed by a row (or column) of mirrors at the same time and then held at the addressing voltages on these electrodes until the same line is re-addressed again. This approach requires matrix addressing with at least one transistor and one storage capacitor for each pair of top and bottom electrodes (e.g., see the discussion with respect to FIG. 11 below). The capacitor plates 440, 442, 444 and 446 can be connected to electrical driving circuitry 426 with vias 448.

In one embodiment, bulk and surface micromachining methods are used to build these structures. The material for the mirror and hinges is a single crystal silicon with very low concentration of impurities and defects, which provides a long lifetime for the hinges. Alternative materials are polysilicon, metals or metal alloys such as berylium-copper. In some embodiments, the mirror and hinges are fabricated with different thickness, which provides the advantage of avoiding excessive wavefront distortions of light reflected from the mirror.

In one embodiment, the fabrication process for structures with different hinge and mirror thicknesses is based on bulk micromachining of double layer silicon-on-insulator (SOI) wafers. The double layer structure is produced by oxidation of silicon wafers, their lamination (internal silicon dioxide layer will be referred to as the first silicon dioxide layer), grinding to reduce the thickness of the silicon layer to the desired thickness of hinges, deposition of another silicon oxide layer (the second silicon dioxide layer), lamination of another silicon wafer and then repeating the process of grinding the wafers to the desired thickness equal to approximately to mirror thickness. Alternatively, epitaxial growth of single crystal silicon is substituted for grinding for one silicon or both silicon layers. The epitaxial option provides good control of thin layers with a good thickness uniformity.

Figures 5A, 5B, 5C:
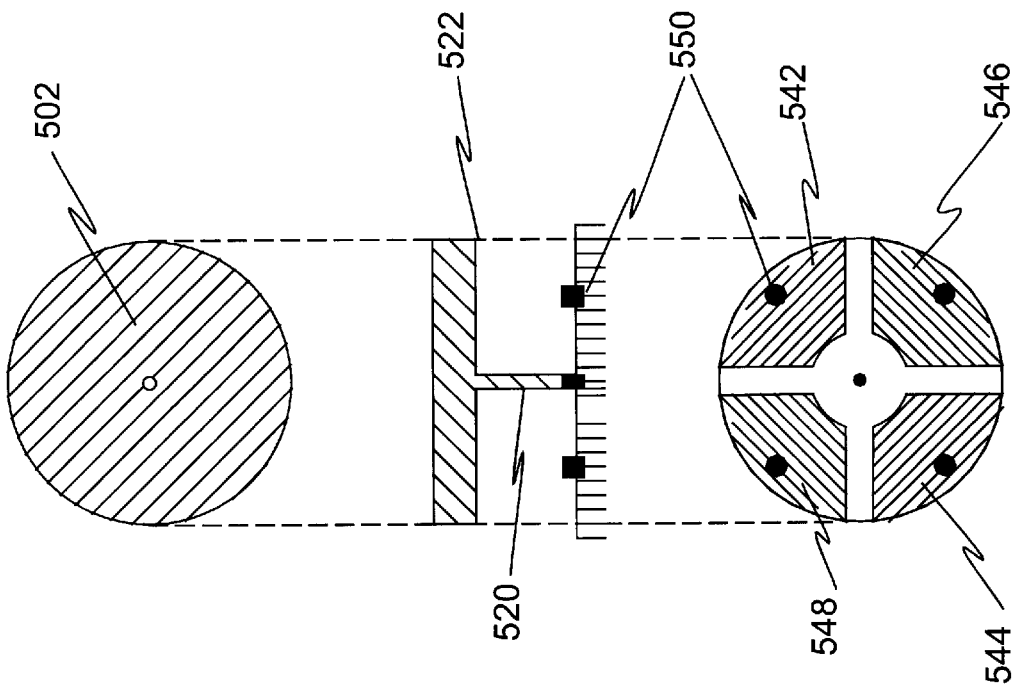
FIGS. 5(a) through 5(c) show an alternative embodiment of a controllable MEMS mirror system.

The fabrication steps with double layer SOI wafer are as follows:
a. oxidation of both sides of the silicon wafer
b. photolithography and etching of silicon dioxide of the bottom side of SOI wafer; separation lines and alignment keys are also etched
c. photolithography and deep, wet silicon etching of the bottom side of the SOI wafer with the first internal silicon dioxide layer acting as the etch stop
d. photolithography on the top side of the wafer for open areas in final structure and etching of silicon dioxide
e. deep, dry reactive ion etching of silicon with the second internal silicon dioxide as an etch stop
f. photolithography for hinges and open areas and etching of silicon dioxide
g. deep, dry reactive ion etching of silicon hinges and open areas in the final structure with the second internal silicon dioxide layer as etch stop
h. etching of silicon dioxide in the exposed areas to open all gaps in silicon
i. metallization of top and bottom with metallic adhesion layer(s) and high reflectivity material such as gold
j. driving electronics on the bottom wafer
k. deposition of insulating layer
l. photolithography and etching of vias for electrical contacts between electronics and electrodes
m. photolithography and silicon etching of gap defining grooves and lock part of alignment structures
n. deposition of metallic layer for electrode fabrication
o. photolithography and etching of conductive electrodes on the bottom wafer FIGS. 5(a) through 5(c) show an alternative embodiment of a controllable MEMS mirror system 500 with a torsional post arrangement. FIG. 5(a) shows a top view, FIG. 5(b) shows a side view, and FIG. 5(c) shows a bottom view. In the embodiment shown in FIGS. 5(a) through 5(c), the mirror system 500 has one hinge post 520 that allows mirror deflections in two directions. The torsional post design shown in FIG. 5 includes four electrodes 542, 544, 546 and 548, but in some embodiments, complete two-directional tilting is achieved using three electrodes. The mirror 502 comprises the second electrode of parallel plate capacitors. The movable mirror 502 is normally held at ground and it is interconnected to the driving electronics through the post 520 and underlying via. Driving voltages are applied between electrodes 542, 544, 546 and 548 and movable plate 522 in a manner similar to that described in FIGS. 4(a) through 4(c). When rotational deflection in which the gap on the right hand side 524 of post is supposed to be reduced, the same voltage is applied to electrodes 542 and 546 while electrodes 544 and 548 and the movable mirror 502 are kept at ground. Electrostatic force pulls the right side 524 of the movable mirror 502 towards electrodes 542 and 546 and generates electrostatic torque that bends the post 520 thus allowing the desired mirror deflection. Other mirror deflections are generated by selecting two electrodes out of four electrodes and applying two different voltages to them, while keeping two remaining fixed electrodes at ground together with the top (movable mirror) electrode.

In alternative embodiments, electromagnetic actuators are built to drive the mirror 502 with one central torsional post. Electrical coils with single or multiple turns are placed on the bottom of the mirror and magnets are located on the sides of mirror assembly. Two or more independent coils and corresponding two or more sets of magnets generate electromagnetic torques in two directions. In yet another embodiment, the placement of coils and magnets are reversed with magnets on the mirror and coils on the base.

A fabrication method for these types of torsional post actuators relies on LIGA (Lithography/Electroplating/Molding). It involves the following steps: photolithography, electroplating or vacuum deposition of the first material, removal of photoresist, deposition of the second material by electroplating or by vacuum deposition, planarization and repetition of the preceding steps for as many layers as needed. The final fabrication step normally involves removal of sacrificial material in order to release the structure.

Figures 6A, 6B:
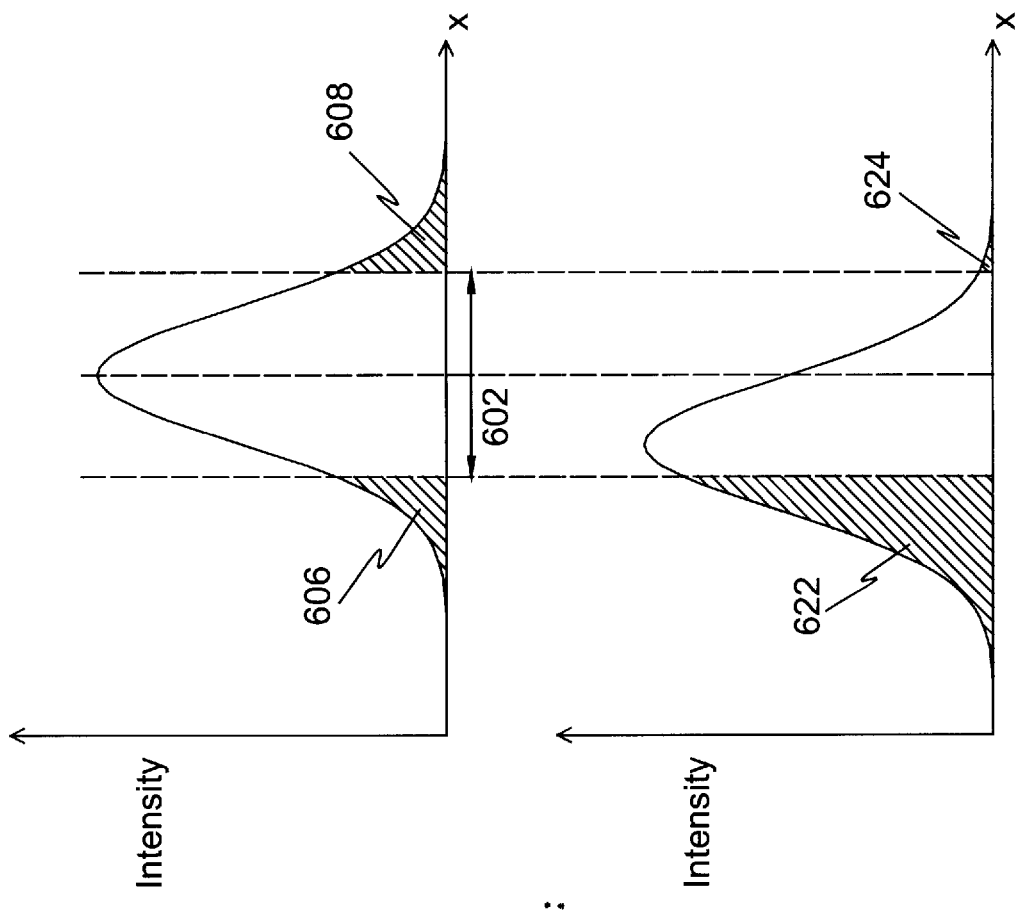
FIGS. 6(a) and 6(b) are plots of the intensity of laser light falling on the outgoing fiber, as a function of distance x, which illustrate the principle of position sensing.

Position Detectors:

FIGS. 6(a) and 6(b) are plots of the intensity of laser light falling on the outgoing fiber, as a function of distance x. These plots will illustrate the principle of position sensing. The plots in FIGS. 6(a) and 6(b) are given only for one dimension x. However, the same principle applies in a second dimension y to provide two-directional positioning feedback. As shown in the plot 600 of FIG. 6(a), the central portion of the light falls onto the core of the fiber 602 and is coupled into the fiber. The shaded regions 606 and 608 indicate light that does not fall onto the core of the fiber 602. This light is lost for data transmission purposes. However, this light is used for position detection. When the two light intensities of shaded regions 606 and 608 are equal, the outgoing light is positioned optimally on the fiber.

FIG. 6(b) is a plot 620 showing a misaligned light beam. When misalignment occurs, the light falling in the two regions 622 and 624 are different. Their difference indicates the amount of misalignment and, when sensed by the position sensor, serves as position error feedback to the servo controller for the closed loop positioning of the light beam.

As seen in plots 600 and 620, this type of position sensing uses only light that would not enter the core of the fiber 602 so it is lost to data transmission anyway. Thus, this type of position sensing does not divert light that would have been collected by the outgoing fiber.

Figure 7:
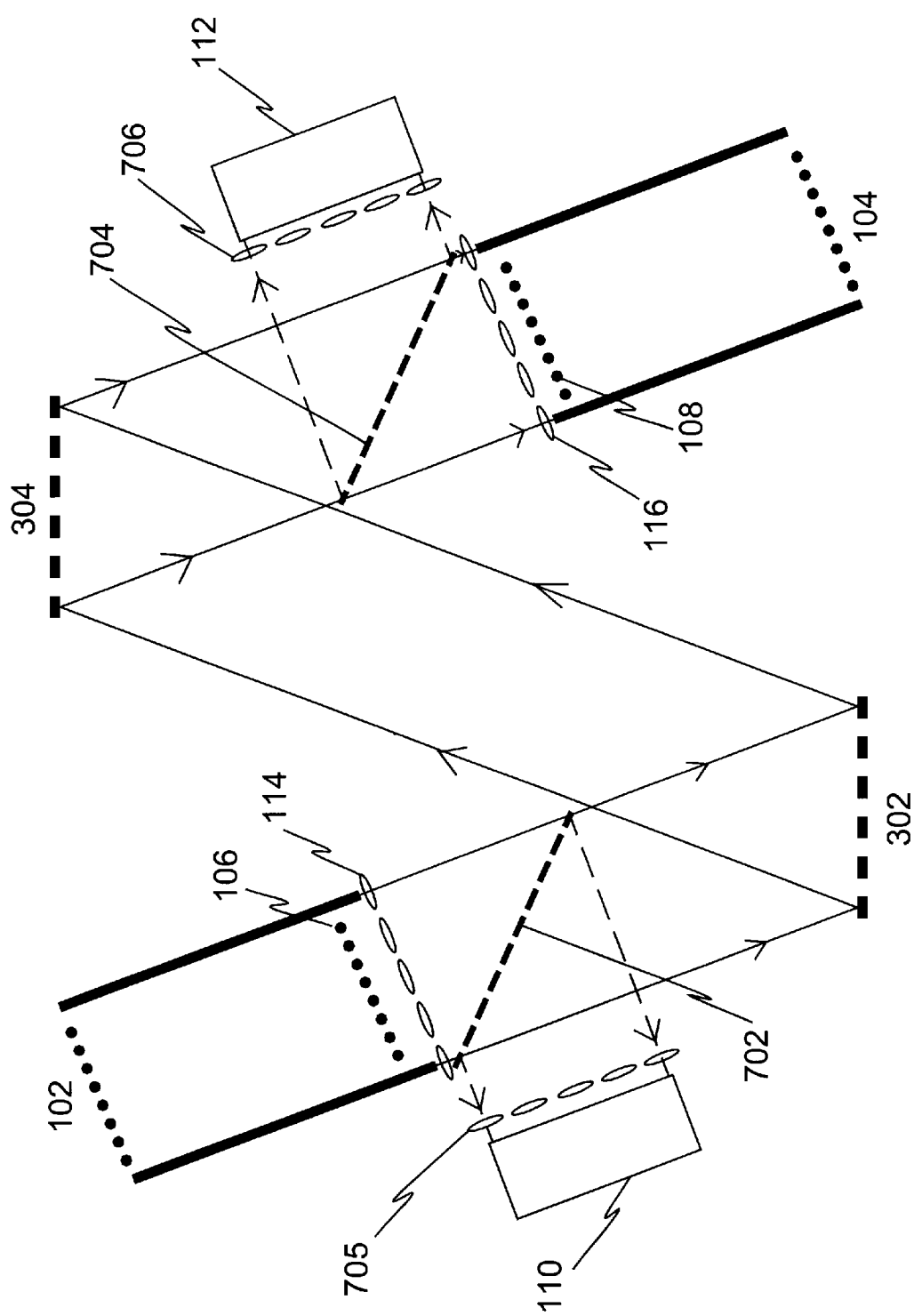
FIG. 7 illustrates an alternative embodiment of an optical cross connect switch.
Figure 8:
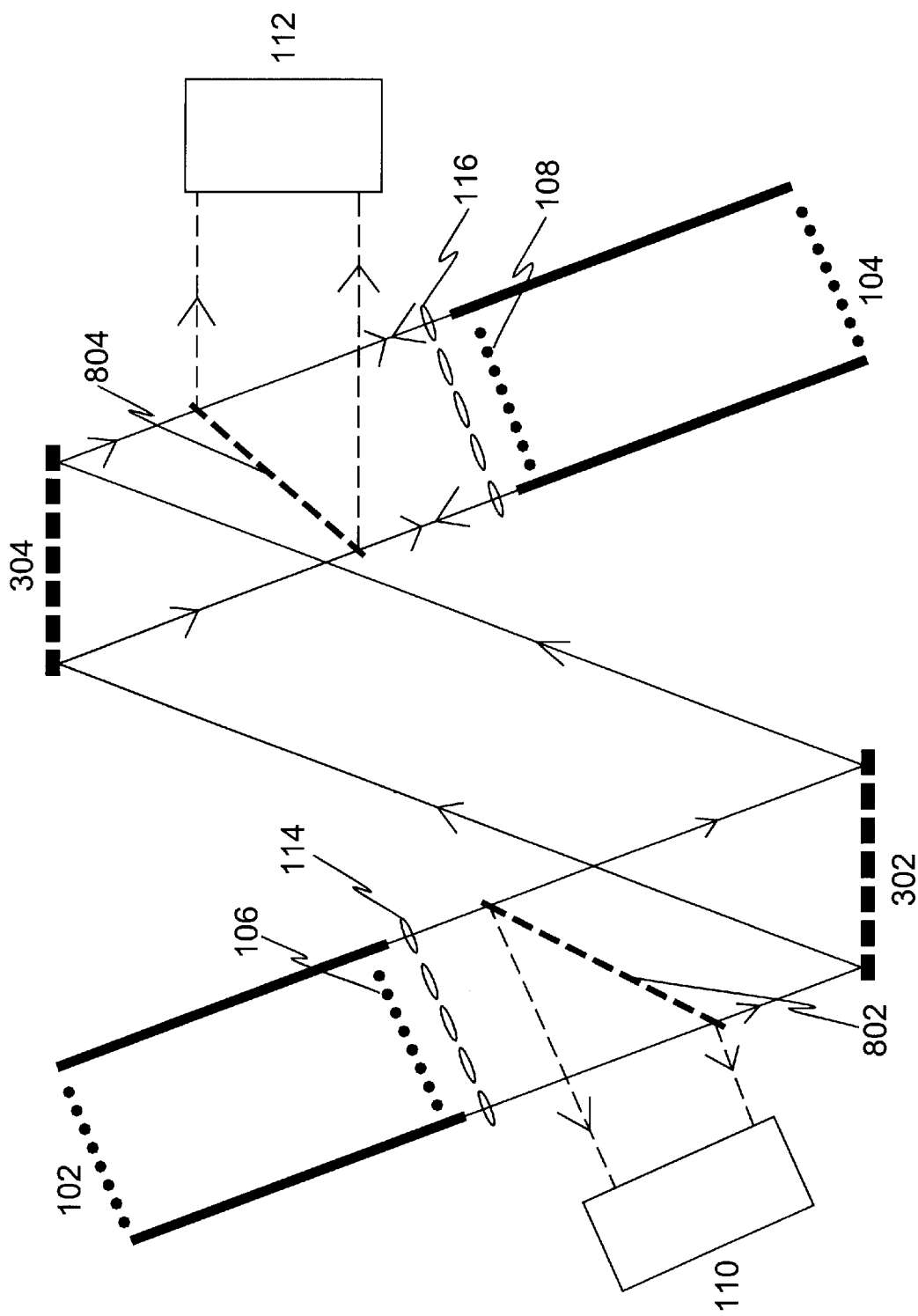
FIG. 8 illustrates yet another embodiment of an optical cross connect switch.

As seen in FIGS. 1–3, in some embodiments, the position sensors are placed directly in front of the outgoing fibers. In other embodiments, position sensors are placed in positions that are not directly in front of the outgoing fibers. In these embodiments, beamsplitters are positioned in the optical path to capture and redirect a fraction of the light in the optical path. Embodiments with beamsplitters result in the loss of light coupled into the fiber. However, these losses are typically only in a range of about 5% to about 10%. FIGS. 7 and 8 show two embodiments that use beamsplitters.

An alternative embodiment of an optical cross connect switch 700 is illustrated in FIG. 7. In the switch 700 of FIG. 7, instead of placing the position sensing detector arrays 110 and 112 in front of fibers, data or registration light beams are split with beamsplitters 702 and 704 before they enter into lens arrays 114 and 116. The beamsplitters are selected so that they allow high transmission (typically above 95%) while reflection is limited to about 5% range. Position sensing detector arrays 110 and 112 are high spatial resolution sensitive arrays, such as bilateral or quadrant detector arrays or imaging arrays such as charged coupled devices (CCD) or complementary metal oxide semiconductor (CMOS) arrays. These imaging arrays preferably have high sensitivity at monitoring wavelengths in order to minimize insertion losses from placement of the beamsplitter into the optical paths.

For transmission of data from incoming fibers 102 into outgoing fibers 104, only beamsplitter 704 and position sensitive detector array 112 are needed. For reverse transmission, beamsplitter 702 and position sensitive detector array 110 are used. The data or registration light beams that exit from fibers 102 propagate from lens array 114 to mirror arrays 302 and 304 in the manner similar to the way described earlier. After light beams are reflected from the mirror array 304, a small fraction of light is reflected by beamsplitter 704 towards position detector array 112. The remaining light is transmitted toward output lens array 116 and outgoing fibers 104. In some embodiments, the size of the position beams is adjusted to match size and pitch of individual detectors by optional lens arrays 706 and 705 placed in front of position sensitive detector arrays 112 and 110 respectively.

When a registration light signal in visible or near infrared (around 980 nm) wavelength $\lambda_s$ is used, silicon based CCD, CMOS, quadrant detectors or bilateral detectors are appropriate choices for position sensitive detectors. When data light at standard optical communication wavelengths (1290–1610 nm) is used for position sensing, these detector arrays are typically based on InGaAs, GaAs, Ge or other infrared photosensitive materials.

In embodiments that include a beamsplitter and position sensing detectors outside the normal optical path between incoming and outgoing fibers, as well as embodiments where the position sensing detectors are in front of the fibers, positioning calibration of detectors is performed with respect to the center cores of optical fibers. The calibration is done by measuring the light intensity that reaches the outgoing fibers. When the light intensity is at its maximum, the two dimensional light beam positions on position sensitive detectors are recorded. This provides initial reference mirror positions that result in the maximum light intensity coupled into the outgoing fibers.

With embodiments where the position sensors are not in front of fibers, determination of reference positions of mirrors and position sensors is done at the same time. The reference position of position sensors is recorded when reference position of mirrors is determined with maximized light intensity coupled into outgoing fibers. The pairs of mirrors from mirror arrays 302 and 304 are moved in small incremental rotational steps while the light intensity coupled into a selected fiber is continuously monitored. When the maximum light intensity is reached, reference mirror position is recorded in terms of two voltages required to attain the optimum position of mirror pair. At the same time, two coordinates representing the position of beamsplitted light beam on the position sensitive detector 112 is recorded.

Yet another embodiment of an optical cross connect switch 800 is illustrated in FIG. 8. In this embodiment, the fiber array surface is covered by a highly reflective surface having openings over the core of fibers. In one embodiment, the pattern of apertures that are positioned over fiber cores is created without photomasking as follows. The completed fiber array with properly terminated fiber ends (this may include plane polishing, angled polishing, laser cutting and polishing and antireflective coatings) is coated with photoresist. All fibers in the array are illuminated from the opposite end with ultraviolet light that provides exposure of photoresist. Subsequently, photoresist is developed and removed from unexposed areas, leaving photoresist covering only the fiber cores. In the next step, a reflective metal film is deposited by sputtering or evaporation over the whole fiber array assembly. In the final step, the photoresist is removed which lifts off the metal covering the fiber cores. This approach provides apertures in the reflective metal coating over the fiber cores without using any photomasking operations. In the switch 800 of FIG. 8, light beams are split with beamsplitters 802 and 804. However, in this case, the light beams travel from the incoming fibers, are reflected off the two mirror arrays 302 and 304, travel to the outgoing fibers and are back reflected from the reflective surface on the outgoing fibers. Light falling onto fiber cores is not reflected. The back reflected light from the outgoing fibers is split by the beamsplitter 802 or 804 onto position sensitive array 110 or 112.

For example, beam of light 308 leaves incoming fiber 306, is collimated by lens 338, and is reflected off mirrors 330 and 334. Then the light beam 308 is focused by lens 342. The part of the focused light beam 308 that does not enter the core of the outgoing fiber 314 is reflected from the reflecting surface that surrounds the core of the outgoing fiber 314. This reflected light returns to beamsplitter 804, where it is split and sent to the position sensitive detector array 112. The position sensitive detector array 112 detects the position of the light beam 308 and provides feedback to the system controller 132.

When bilateral and quadrant position sensitive detectors are used in the position sensitive detector arrays 110 and 112 in FIG. 8, apparent beam positioning is obtained and corrections are applied to determine actual positions. When imaging arrays are used, an image of the aperture around the fiber core and back reflected light are both recorded in the image. This embodiment provides the advantage that both fiber cores and light beams are imaged, so no referencing calibration is needed.

Figures 9A, 9B:
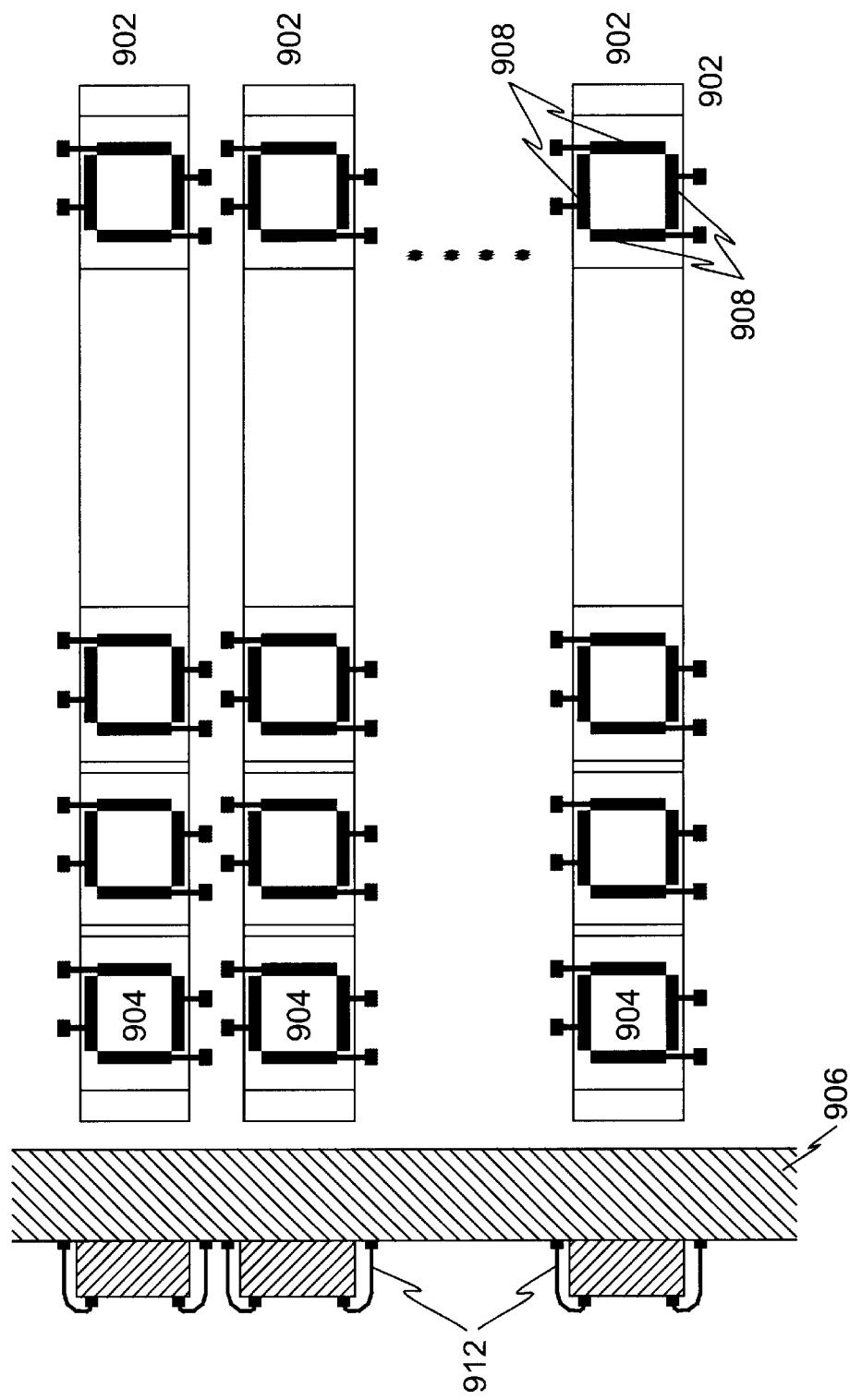
FIGS. 9(a) and 9(b) illustrate one embodiment of a position sensing array with bilateral position sensitive detectors.

FIGS. 9(a) and 9(b) illustrate one embodiment of a position sensing detector array 900 with bilateral sensors. FIG. 9(a) represents the top view while FIG. 9(b) is the side view of the array. The embodiment illustrated in FIGS. 9(a) and 9(b) is applied in cases where the position sensing photodetector arrays are not directly in front of the fibers, such as the embodiments shown in FIGS. 7 and 8. In these embodiments, there is space behind the position sensing arrays available for electrical leads and integrated circuits that amplify the signals. The position sensing photodetector array 900 shown in FIGS. 9(a) and 9(b) is based on rows 902 of position detectors 904 that are attached to a chip 906 that includes integrated circuits that provide amplification of photocurrent and signal multiplexing. Each position sensor 904 has four electrodes 908. Electrical leads 912 connect the electrodes 908 to integrated circuit amplifiers on chip 906. The light beam that impinges onto the photosensitive surface leads to generation of photocurrent that flows toward all four electrodes 908. The relative magnitudes of the four currents through the electrodes 908 correspond to where the beam is located on the photosensitive surface, and provides the x and y position of the light beam. The photodetector's sensitive area is smaller than the pitch between mirrors or fibers in order to accommodate all electrical leads.

FIGS. 10(a), 10(b) and 10(c) illustrate another embodiment of a position sensitive detector array 1000 suitable for use with the systems shown in FIGS. 1–3, where the position sensitive array is placed directly in front of or even in contact with the fiber array. Fiber array 1001 has cladding regions 1015 and core regions 1014. The position sensitive detectors 1010 are placed on the face of fiber array. The light is coupled into the fibers with lens array 1003.

Detailed front and side views of the single quadrant photodetector 1010 that is used in some embodiments where the position sensitive detector array is in front of the fiber array are shown in FIGS. 10(b) and 10(c), respectively. The detector 1010 is divided into four quadrants 1002, 1004, 1006 and 1008. Each quadrant contains a separate detector such as a photosensitive p-n junction or photosensitive pin diode 1012. Each of these detectors 1002, 1004, 1006 and 1008 covers about a 90 degree region. The detectors do not cover the center of the fiber over an area that corresponds to the core of the fiber 1014. This area contains material that is transparent at the operational wavelength or an opening without any material. Consequently, this embodiment is suitable for use with the embodiment shown in FIGS. 1–3. The cross section of an embodiment of a pin diode 1012 is shown in FIG. 10(c). The electrode 1016 is a is common electrode and the four detector regions 1002–1008 provide four separate signals into four single ended or two differential amplifiers.

In some embodiments, quadrant photodetectors in FIG. 10 are substituted by bilateral detectors similar to those described above in FIG. 9. When bilateral sensor arrays are placed in front of fibers, then one sensor with an opening over the core of the fiber is used. The sensor has four electrodes positioned on the outside edges of a photosensitive multilayer structure as in FIG. 9 above. Signals collected from these four electrodes reflect the two directional position of the light beam.

FIGS. 11(a) and 11(b) illustrate electrical lead interconnects 1100 for large position sensitive detector arrays. The interconnects 1100 shown in FIGS. 11(a) and 11(b) allow large numbers of leads to be accommodated, even when there is little space available between the sensors. The interconnects 1100 also allow fast readout of the sensors in the array. This is done by performing a matrix readout row by row (or column by column). This allows readout of one complete row at a time. The implementation shown in FIG. 11 is illustrated with an array of quadrant detectors 1104. Front electrode column leads 1102 and row leads 1110 are connected to transistors 1108. The signals applied to the row leads 1110 select one row at the time that is being read out. The signals that appear on columns correspond to positions of light beams in that specific row. During the next readout period, the next row is addressed and read out. All detectors have the same common ground electrode 1116, shown in FIG. 11(b). The configuration of this ground electrode is the same as shown in cross section in FIG. 10(c). For embodiments where the common electrode 1116 is metal, the common electrode 1116 has openings for light passing into fibers. In some embodiments, where a transparent electrode such as indium-tin oxide film is used, the common electrode 1116 is continuous. Signals from these photodetectors 1104 are fed into amplifiers to generate two sets of feedback signals that are fed into the servo controller. In response to the feedback signals, the switch controller 132 controls the positioning and alignment of all mirrors in the mirror array to align the light beam onto the core of fibers in two directions and maintains the alignment until instruction is received to change the configuration.

Figures 12A, 12B:
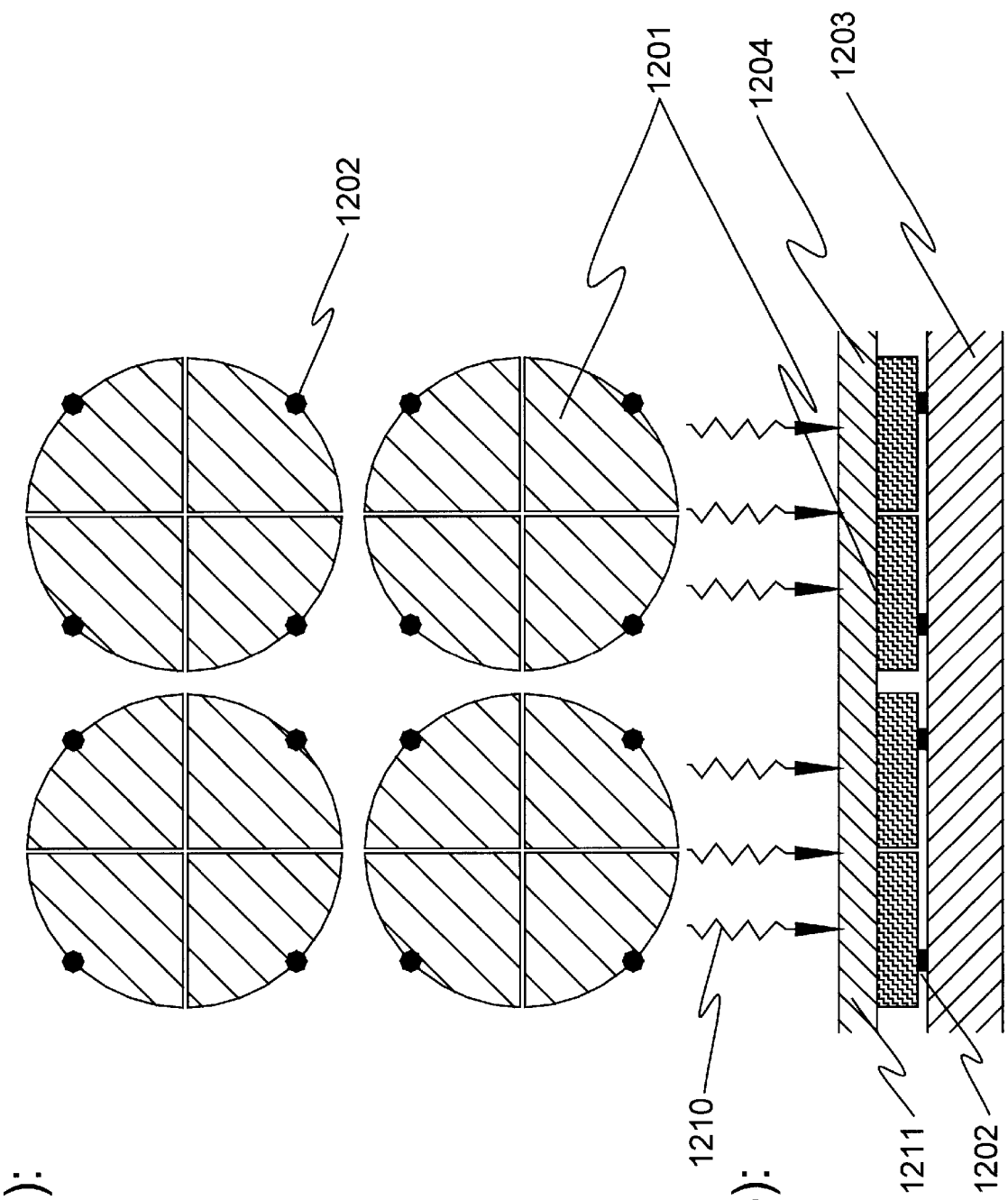
FIGS. 12(a) and 12(b) illustrate a quadrant photodetector array.

FIGS. 12(a) and 12(b) illustrate another configuration of position sensitive detector array 1200. In the previous described embodiments, the illuminated surface and non-ground electrodes are on the same surface (so called front side illumination). In the embodiment of FIG. 12, illuminated surface 1211 and non-ground electrodes 1202 are on the opposite sides (so called back side illumination). Light beams 1210 impinge on the substrate 1204 of position sensitive detector array. In this case, the substrate 1204 is relatively thin and does not significantly absorb the light. Most of light reaches the p-n junctions of quadrant photodetectors 1201 where photogenerated carriers are formed. The electrodes 1202 provide electrical path for carriers to amplifiers that reside in layer 1203. This quadrant photodetector 1201 generates again two dimensional position sensitive signals. In some embodiments, the photodetector array 1200 is placed directly over a substrate 1203 containing amplifiers and processing electronics. This configuration of detectors is well suited for architecture described in FIGS. 7 and 8.

Figures 13A, 13B:
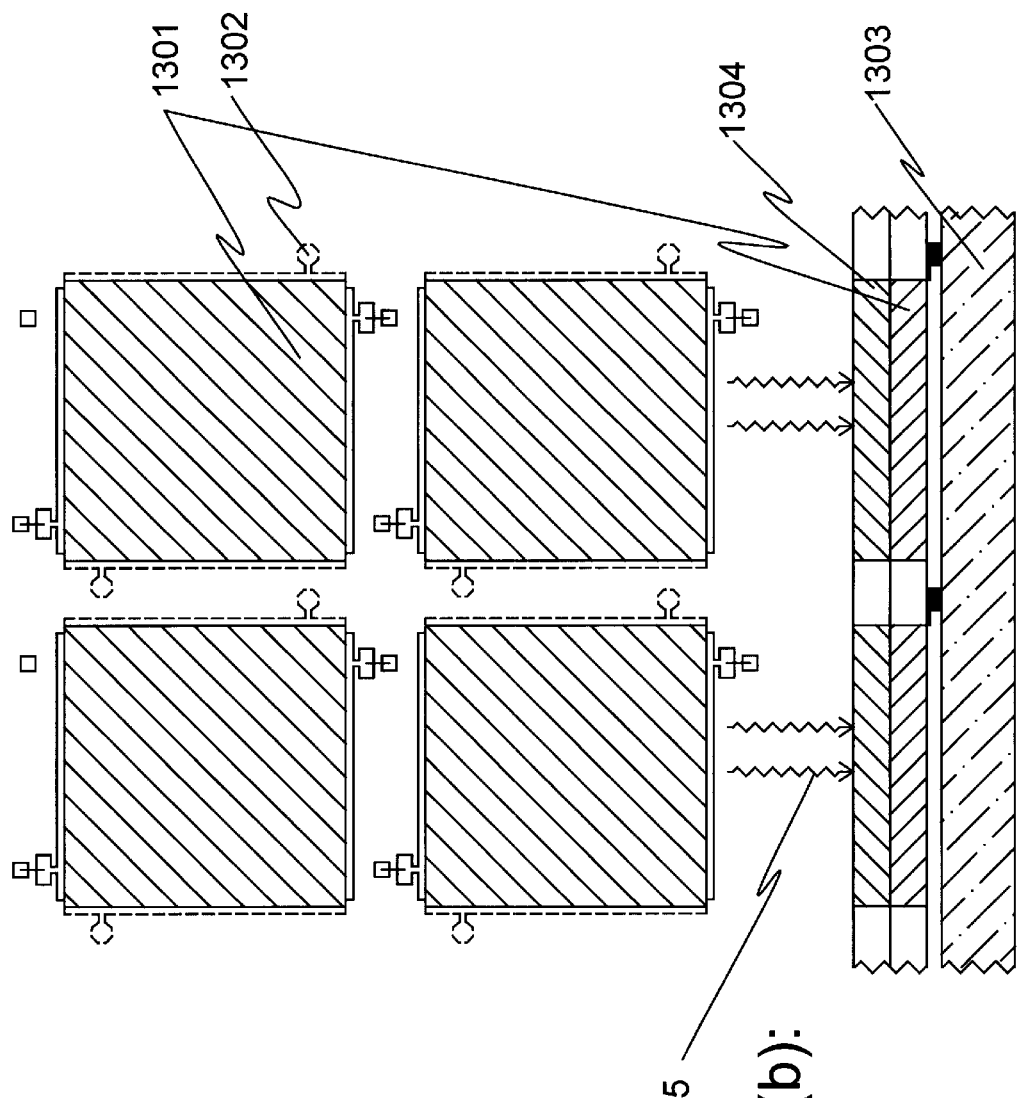
FIGS. 13(a) and 13(b) illustrate a bi-lateral photodetector array.

FIGS. 13(a) and 13(b) illustrate another backside illumination architecture of position sensitive detectors with bi-lateral photodetector array 1300. The bi-lateral photodetectors 1301 generate two dimensional position sensitive signals. Each photodetector 1301 has four electrodes 1302. Light beams 1305 impinge on the backside of array 1300. The electrodes 1302 connect the photodetectors 1301 to the substrate 1303 with amplifier electronics. This embodiment is also well suited to the systems described in FIG. 7 and 8.

In some embodiments, imaging CCD or CMOS arrays are used for beam positioning instead of quadrant or bi-lateral arrays in the locations for the position sensor arrays shown in FIGS. 7 and 8. Readout of the CCD or CMOS array provides data to servo control.

Fiber and Lens Arrays:

The fiber alignment structures 106 and 108 in FIGS. 1 and 3 and in FIGS. 7 and 8 can be one- or two-dimensional depending on the size of the optical cross connect switch. Both one- and two-dimensional fiber arrays have precise fiber positioning and beam directionality. One embodiment of one-dimensional fiber arrays is a structure of V grooves in single crystal silicon. Two dimensional fiber alignment structures 106 and 108 for incoming and outgoing fibers are formed from a micromachined array of holes in silicon.

Figure 14:
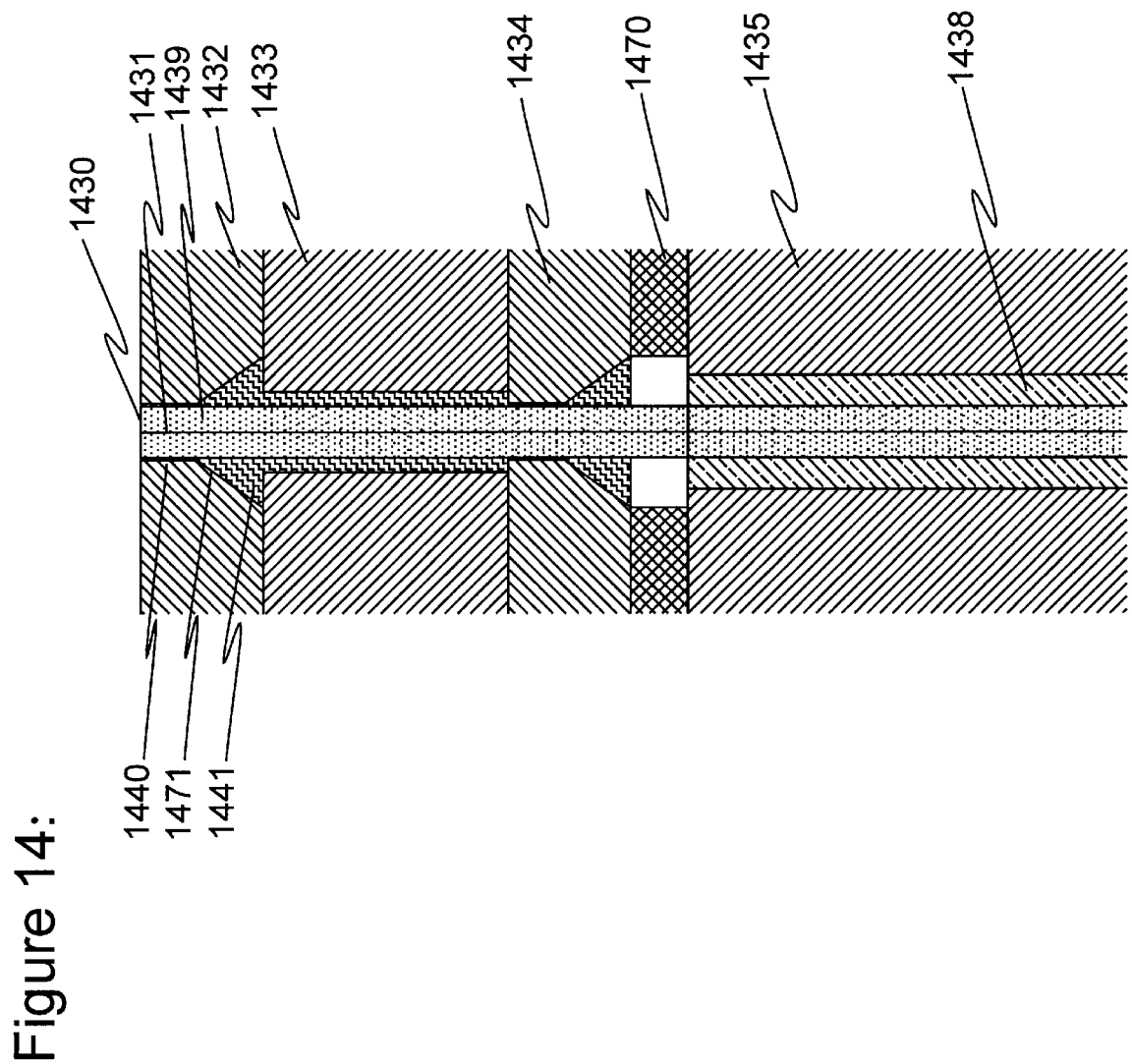
FIG. 14 illustrates an embodiment of the fiber alignment structure in cross-section.

FIG. 14 illustrates an embodiment of the fiber alignment structure 1400 in cross-section. FIG. 14 shows a section of the fiber alignment structure 1400 with one fiber 1430. The complete fiber alignment structure 1400 positions many fibers. The section of fiber 1430 within the fiber alignment structure 1400 contains a section with exposed fiber cladding 1439 and a section where the buffer 1438 is present. Multiple constricted channels or necks in the alignment layers 1432–1434 define the fiber position and also the direction of light exiting from the fiber 1430. Fiber cladding 1439 is aligned and held with precision of less than one micron by a series of alignment layers 1432 and 1434. These layers have guiding and aligning regions. The neck regions 1440 define the positions of the fibers, and the funnel regions 1441 provide a guide for massive, parallel insertion of many fibers 1430 into the structure. In order to achieve desired beam directionality, alignment layers 1432 and 1434 are separated by a spacer 1433.

An embodiment with a neck-funnel-neck-funnel (going from the surface of the fiber array 1430 towards the fiber buffer 1438) arrangement and an even or odd number of alignment layers is shown in FIG. 14. In alternate embodiments with neck-funnel-funnel-neck arrangement, both an odd number of alignment layers are used. Alignment layers 1432 and 1434 and fiber 1430 are secured together with glass or glue bonds 1471 so that a hermetic seal is formed between the fiber 1430 and alignment layers 1432 and 1434. Glass bonding provides the advantages of having a thermal coefficient match between the fiber glass and bonding glass and an environmentally stable glass seal. Glass bonding uses relatively high temperatures. Therefore, in embodiments with glass bonding, special insulation spacers 1470 are included in the alignment structures to thermally isolate buffer 1438 from alignment layers 1432–1434 during glass bonding.

The multiple constricted channels or necks in the alignment layers 1432 and 1434 define the fiber positions and also the direction of light exiting from the fiber 1430. The alignment layers 1432 and 1434 are usually fabricated from single crystal silicon. The funnel regions 1441 are defined with wet etching while neck regions 1440 are fabricated with deep relative etching of silicon.

The buffer 1438 is configured to provide crude positioning and strain relief for fiber 1430. In some embodiments, a buffer alignment block 1435 with cylindrical holes serves as a positioner and holder of buffer coatings. Alternatively, an approach similar to that used with fiber alignment layers is followed with buffer alignment layers. Openings in the buffer alignment block 1435 are larger than the funnels and bottlenecks in the fiber alignment layers 1432 and 1434 to accommodate the larger buffer diameter. Buffer 1438 and buffer alignment block 1435 are glued together to mechanically stabilize the structure and further seal it for hermetic isolation from outside environment.

The overall structure contains alignment features on each top and bottom surface of each alignment chip. In some embodiments, these alignment layers are formed by two-sided photolithography so that alignment down to one micron is possible. V grooves formed in single crystal silicon, as outlined above, present an example of an alignment structure. Fibers having precise diameter and circular cross-sections are inserted into V grooves and they self align bottom surface of one chip and the top surface of another chip. Multiple stack of chips are aligned this way and achieve chip-to-chip alignment with precision down to one micron. The structure also contains vias that go through the buffer layer and at least one alignment layer. Mechanical pins, of a controlled diameter and concentricity, are inserted into these vias to align the alignment layer and buffer block.

Lens arrays 114, 116 in FIGS. 1 and 3 or lens arrays 210 and 212 in FIG. 2 are one or two dimensional matrices of lenses. Spherical ball lenses placed in the two dimensional array of precisely micromachined cylindrical or tapered holes and lens matrices fabricated with gray scale lithography, with embossing or ink jet formation of glass or polymer are examples of the fabrication processes of microlens arrays.

Figure 15A:
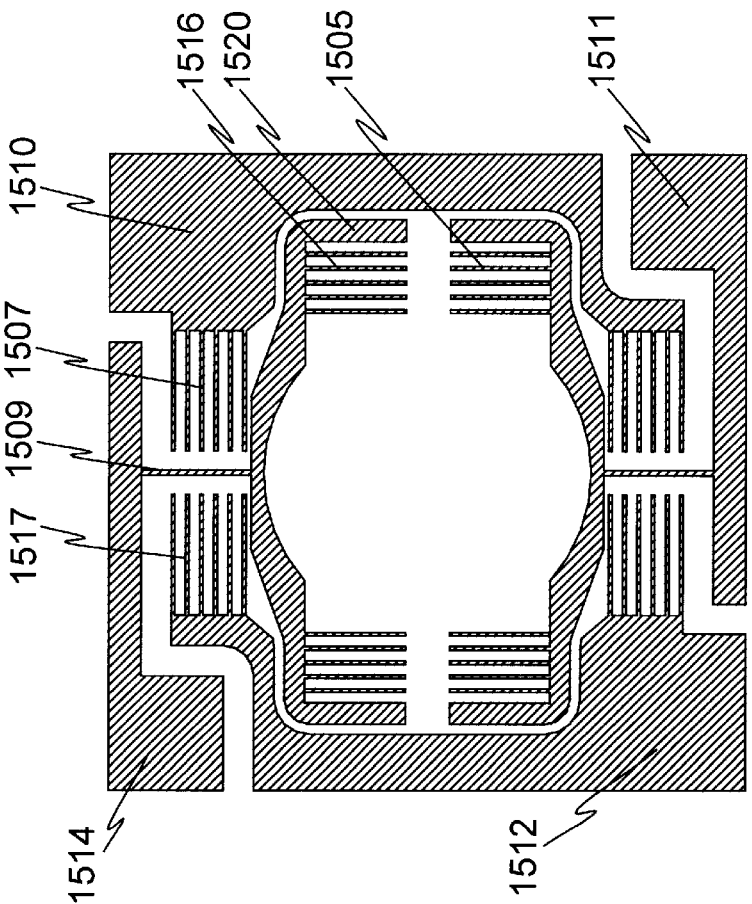
FIGS. 15(a) and 15(b) detail an electrostatically-driven MEMS mirror with a two-directional rotational comb actuator.
Figure 15B:
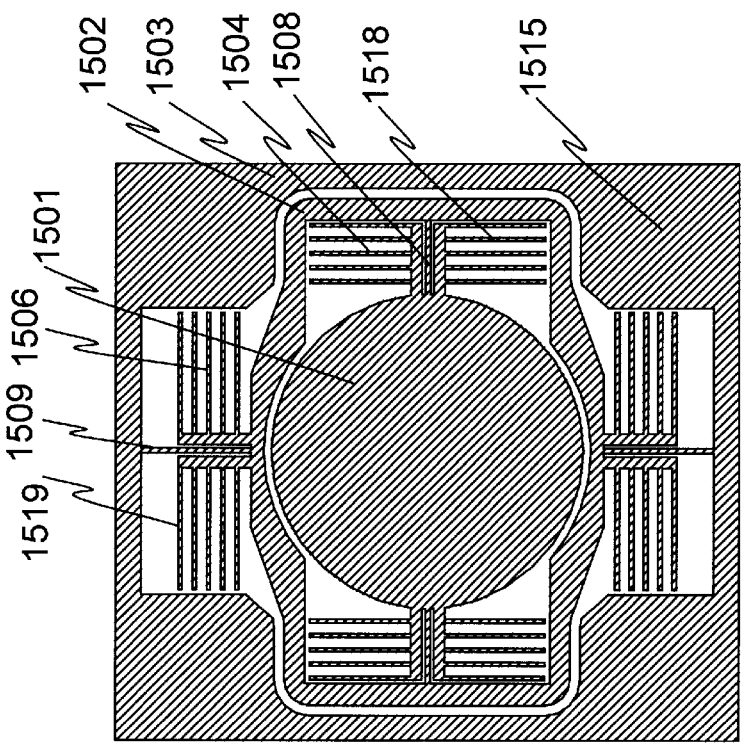

Mirror Actuator:

FIGS. 15(*a*) and 15(*b*) detail an electrostatically-driven MEMS mirror system with a two-directional rotational comb actuator. The rotational motion is generated by attractive forces between oppositely charged teeth. The MEMS mirror system has a mirror 1501, an inner frame 1502, an outer frame 1503, sets of inner movable teeth 1504 and 1518, sets of inner fixed teeth 1505 and 1516, sets of outer movable teeth 1506 and 1519, sets of outer fixed teeth 1507 and 1517, two inner hinges 1508 and two outer hinges 1509. The set of inner fixed teeth 1505 are fixed with respect to the movable inner teeth 1504, but not with respect to outer frame 1503. The top actuator portion, shown in FIG. 15(*a*), is electrically isolated from the bottom actuator part, shown in FIG. 15(*b*). The mirror 1501, teeth 1504, 1518, 1506 and 1519, inner frame 1502, outer frame 1503 and hinges 1509 and 1508 are kept at the same potential, typically ground, labeled as 1515. Voltages are applied to bottom teeth 1516, 1505, 1509 and 1517 in order to generate rotational deflections. The voltages are applied through electrically conducting blocks 1510, 1511, 1512 and 1514 that are electrically isolated from each other but are connected electrically to teeth 1507, 1505, 1517, and 1516 respectively.

The following description of the operation of the actuator only deals with one rotational deflection of the mirror 1501. However, the other deflections of mirror 1501 and inner frame 1502 are generated in the similar manner. In order to rotate the mirror 1501 around the axis defined by inner hinges 1508 so that the top part of the mirror moves down and consequently the bottom part of the mirror moves up, the voltage is applied to electrode 1514 while all other electrodes 1510, 1511 and 1512 are kept at ground. The electrostatic attraction between inner movable teeth 1504 and inner fixed teeth 1516 generates rotation around an axis going through two inner hinges 1508. In order to generate rotational motion in two directions, two different voltages are applied. One voltage is applied as described above between top ground plate 1515 and teeth 1516 and another voltage is applied between the ground plane 1515 and outer fixed teeth 1507.

The electrostatic rotational comb actuator has the advantage of generating significantly greater torque than some other actuators. Consequently, higher rotational angles can be obtained with rotational comb drive than with other types of drives, such as parallel plate drive, at the same driving voltages. Alternatively, when the same driving voltages are used, a MEMS mirror system with rotational comb drive can have much higher hinge stiffness than parallel plate drive and still obtain the same rotational angles.

Mirror Control:

The servo system operates in the following manner: The electronics continuously scans through the whole system sequentially, typically one row of photodetectors and one row of mirrors at a time, with an overall cycle period Tc. When there are N fibers present, time to detect signals from a single row of photodetectors will be about tu=Tc/sq.rt.(N) Once the signals from the photodetectors are acquired, the driving voltages to all mirrors in a given column are adjusted and kept at this level until the photodetectors are readdressed Tc time later. In the following update period tu, the next row of photodetectors is sensed and voltages for the second set of mirror electrodes are re-adjusted. The updating time tu depends on the time necessary to acquire signals with an acceptable signal-to-noise ratio. The overall cycle period Tc depends on the number of mirrors in the array, but is typically kept below 1 msec even for large arrays. The drifts and environmental changes have a time scale that is much longer than the update time. Shock and vibration disturbances are also minimized through closed loop control. In some embodiments, closed loop servo control is used in these applications.

Other Applications:

Apart from using the above described arrays as cross connect switches, other applications include the following:

a. Optical add-drop multiplexers when N fiber lines are brought in and N+M fibers are brought out. The system permits M lines to be dropped and M other lines to be added.

b. Controlled variable optical attenuators with calibrated deflections. In other words, the light beams may be intentionally misaligned to the fiber cores in order to introduce a certain amount of attenuation.

c. Compensation of polarization mode dispersion.

While the invention has been particularly shown and described with reference to a preferred embodiment and several alternate embodiments, it will be understood by persons skilled in the relevant art that various changes in form and details can be made therein without departing from the spirit and scope of the invention.

We claim:

1. An optical cross connect switching system for directing optical signals from incoming fibers in a first optical fiber array to selected destination outgoing fibers in a second optical fiber array, the system comprising:
- a first mirror array for controllably reflecting the optical signals received from the incoming fibers to the selected destination outgoing fibers, and comprising a plurality of controllably deflectable mirrors and an input;
- a first position sensitive detector array for detecting the position of optical signals incident thereon, the position of optical signals incident thereon corresponding to the position of the optical signals incident on the selected destination outgoing fibers in the second optical fiber array, and comprising an output; and
- a system controller coupled to the output of the first position sensitive detector array and to the input of the first mirror array, for controlling the deflections of the mirrors of the first mirror array in response to the destination outgoing fibers selected for the optical data signals and in response to the detected positions of the optical signals.

2. The system of claim 1, further comprising light intensity monitors coupled to the outgoing fibers and the system controller for monitoring the intensity of the optical signals received by the selected destination outgoing fibers and outputting the intensity of the optical signals received by the selected destination outgoing fibers to the system controller.

3. The system of claim 1 further comprising:
- a second mirror array for controllably reflecting the optical signals from the first mirror array into the outgoing fibers, and comprising a plurality of controllably deflectable mirrors and an input; and wherein:
- each incoming fiber is aligned with one of the mirrors in the first mirror array;
- each outgoing fiber is aligned with one of the mirrors in the second mirror array; and
- the system controller is further coupled to the input of the second mirror array to control the deflections of the first and second mirror arrays, to reflect each optical signal from the incoming optical fiber to the mirror in the first mirror array that is aligned with the incoming optical fiber to the mirror in the second mirror array that is aligned with the selected destination outgoing fiber to the selected destination outgoing fiber.

4. The system of claim 3 further comprising a second position detector array for detecting the position of optical signals incident thereon, the position of optical signals incident thereon corresponding to the position of the optical signals incident on selected incoming fibers in the first optical fiber array, and comprising an output coupled to the system controller, wherein the system controller further controls the deflections of the mirrors in the first and second mirror arrays in response to the positions of the optical signals detected by the second position detector array.

5. The system of claim 4, wherein the second position detector array is selected from a group consisting of a bi-lateral position sensitive detector array, a quadrant position sensitive detector array, a charged coupled device (CCD) array, a complementary metal oxide semiconductor (CMOS) array, and an infrared imaging array.

6. The system of claim 4, wherein the optical signals have a data signal wavelength and the first and second position detector arrays are sensitive at the data signal wavelength.

7. The system of claim 4, further comprising a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array, and wherein the first and second position detector arrays are sensitive at the registration light signal wavelength.

8. The system of claim 3 further comprising a beamsplitter for splitting off a portion of the optical signal reflected from the second mirror array and directing said portion towards the first position sensitive detector array.

9. The system of claim 3 further comprising:
- a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array; and
- a coarse wavelength division demultiplexer for reflecting the registration light towards the first position sensitive detector array and transmitting data optical signals to a face of the second optical fiber array.

10. The system of claim 3 further comprising:
- a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array; and
- a coarse wavelength division demultiplexer for reflecting registration light back-reflected from a face of the second optical fiber array and directing said portion towards the first position sensitive detector array and transmitting data optical signal to a face of the second optical fiber array.

11. The system of claim 3 further comprising:
- a first lens array having a lens associated with each of the incoming fibers;
- wherein each lens is positioned to collimate the optical signals from the incoming fiber in the first optical fiber array onto the first mirror array;
- wherein each lens-incoming fiber combination comprises an incoming fiber-lens assembly; and
- wherein each incoming fiber-lens assembly is aligned with one of the mirrors in the first mirror array.

12. The system of claim 3 further comprising:
- a second lens array having a lens associated with each of the outgoing fibers;
- wherein each lens is positioned to focus the optical signals onto the outgoing fiber in the second optical fiber array;
- wherein each lens-outgoing fiber combination comprises an outgoing fiber-lens assembly; and
- wherein each outgoing fiber-lens assembly is aligned with one of the mirrors in the second mirror array.

13. The system of claim 3 wherein the first position detector array is placed between the second mirror array and the second optical fiber array.

14. The system of claim 3, wherein the second mirror array is a micro electro mechanical system (MEMS) mirror array.

15. The system of claim 3, wherein the second mirror array is one-dimensional array.

16. The system of claim 3, wherein the second mirror array is a two-dimensional array.

17. The system of claim 3 further comprising a second position sensitive detector array for detecting the position of optical signals incident thereon, the position of optical signals incident thereon corresponding to the position of the optical signals reflected from the first mirror array and corresponding to the position of the optical signals incident on the selected destination outgoing fibers in the second optical fiber array, and comprising an output coupled to the system controller, wherein the system controller further controls the deflections of the mirrors in the first and second mirror arrays in response to the positions of the optical signals detected by the second position detector array.

18. The system of claim 17 further comprising a beamsplitter for splitting off a portion of the optical signal reflected from the second mirror array and directing said portion towards the second position sensitive detector array.

19. The system of claim 17 further comprising:
a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array; and
a coarse wavelength division demultiplexer for reflecting the registration light towards the second position sensitive detector array and transmitting data optical signals to a face of the second optical fiber array.

20. The system of claim 17 further comprising:
a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array; and
a coarse wavelength division demultiplexer for reflecting registration light back-reflected from a face of the second optical fiber array and directing said portion towards the second position sensitive detector array and transmitting data optical signal to a face of the second optical fiber array.

21. The system of claim 17, further comprising:
a second lens array having a lens associated with each of the outgoing fibers;
wherein each lens is positioned to focus the optical signals onto the outgoing fiber in the second optical fiber array; and
wherein the second position detector array is positioned between the second lens array and the second optical fiber array.

22. The system of claim 21, further comprising:
a beamsplitter positioned between the second mirror array and the second lens array for splitting off a portion of the optical signal reflected from the second mirror array and directing said portion towards the second position detector array.

23. The system of claim 17 further comprising:
a beamsplitter positioned between the first and second mirror arrays; and
wherein the second position detector array is positioned adjacent to the beamsplitter.

24. The system of claim 17 further comprising third and fourth position detector arrays for detecting the position of optical signals incident thereon, the position of optical signals incident on the fourth position detector array corresponding to the position of the optical signals incident on selected outgoing fibers in the first optical fiber array, the position of optical signals on the third position detector array corresponding to the position of the optical signals incident on the mirrors in the second mirror array, and comprising an output coupled to the system controller, wherein the system controller further controls the deflections of the mirrors in the first and second mirror arrays in response to the positions of the optical signals detected by the second position detector array.

25. The system of claim 1 further comprising.
a first lens array having a lens associated with each of the incoming fibers;
wherein each lens is positioned to collimate the optical signals from the incoming fiber in the first optical fiber array onto the first mirror array; and
wherein each lens-incoming fiber combination comprises an incoming fiber-lens assembly.

26. The system of claim 25 wherein each incoming fiber-lens assembly is aligned with one of the mirrors in the first mirror array.

27. The system of claim 1 further comprising:
a second lens array having a lens associated with each of the outgoing fibers;
wherein each lens is positioned to focus the optical signals onto the outgoing fiber in the second optical fiber array; and
wherein each lens-outgoing fiber combination comprises an outgoing fiber-lens assembly.

28. The system of claim 27 wherein the first position detector array is positioned between the second lens array and the second optical fiber array.

29. The system of claim 27 wherein each outgoing fiber-lens assembly is aligned with one of the mirrors in the first mirror array.

30. The system of claim 1 wherein the optical signals on at least one of the incoming fibers and on at least one incoming wavelength in the first optical fiber array comprise an optical destination signal carrying information identifying the selected destination outgoing fibers for the optical signals on the incoming fibers, and further comprising a switch configuration controller with an input for receiving the optical destination signal and an output for outputting the identity of the selected destination outgoing fibers to the system controller.

31. The system of claim 1, further comprising a registration light source coupled to an incoming fiber in the first optical fiber array for adding a registration light signal to the optical signals, wherein the registration light signal is at a different wavelength than data signals within the optical signals but is coincident with the data signals when leaving the first optical fiber array.

32. The system of claim 31 wherein the first position sensitive detector array detects the position of the registration light signals.

33. The system of claim 31 further comprising:
a coarse wavelength division demultiplexer for reflecting the registration light towards the first position sensitive detector array and transmitting data optical signals to a face of the second optical fiber array.

34. The system of claim 31 further comprising:
a coarse wavelength division demultiplexer for reflecting registration light back-reflected from a face of the second optical fiber array and directing said portion towards the first position sensitive detector array and transmitting data optical signal to a face of the second optical fiber array.

35. The system of claim 31, wherein the registration light source has a wavelength and the first position detector array is sensitive at the wavelength of the registration light source.

36. The system of claim 1 further comprising a beamsplitter for splitting off a portion of the optical signal reflected from the first mirror array and directing said portion towards the first position sensitive detector array.

37. The system of claim 1 further comprising:
a beamsplitter for splitting off a portion of the optical signal back-reflected from a face of the second optical fiber array and directing said portion towards the first position sensitive detector array.

38. The system of claim 1 wherein the first position detector array is positioned between the first mirror array and the second optical fiber array.

39. The system of claim 1 further comprising a second position detector array for detecting the position of optical signals incident thereon, the position of optical signals incident thereon corresponding to the position of the optical signals incident on selected outgoing fibers in the first optical fiber array, and comprising an output coupled to the system controller, wherein the system controller further controls the deflections of the mirrors in the first mirror array in response to the positions of the optical signals detected by the second position detector array.

40. The system of claim 1, wherein the first mirror array is a micro electro mechanical system (MEMS) mirror array.

41. The system of claim 40, wherein the first mirror array is driven by bi-axial electrostatic actuators.

42. The system of claim 40, wherein the plurality of controllably deflectable mirrors of the first MEMS mirror array comprises bi-axial mirrors having two sets of hinges.

43. The system of claim 40, wherein the plurality of controllably deflectable mirrors of the first MEMS mirror array comprises a center torsional post.

44. The system of claim 40, wherein the plurality of controllably deflectable mirrors of the first MEMS mirror array has electrostatic drive.

45. The system of claim 40, wherein the plurality of controllably deflectable mirrors of the first MEMS mirror array comprises bi-axial mirrors having electromagnetic drive.

46. The system of claim 40, wherein the plurality of controllably deflectable mirrors of the first MEMS mirror array comprises bi-axial mirrors having piezoelectric drive.

47. The system of claim 1, wherein the first mirror array is one-dimensional array.

48. The system of claim 1, wherein the first mirror array is a two-dimensional array.

49. The system of claim 1, wherein the first position detector array is selected from a group consisting of a bilateral position sensitive detector array, a quadrant position sensitive detector array, a charged coupled device (CCD) array, a complementary metal oxide semiconductor (CMOS) array, and an infrared imaging array.

50. The system of claim 1, wherein the optical signals have a data signal wavelength and the first position detector array is sensitive at the data signal wavelength.

51. The system of claim 1 wherein the first position sensitive detector array comprises a plurality of detectors, and each detector is a bi-lateral position sensitive detection type detector.

52. A method for directing optical signals from incoming fibers in a first optical fiber array to selected destination outgoing fibers in a second optical fiber array, the method comprising:
determining the selected destination outgoing fibers;
reflecting, with a first mirror array comprising a plurality of controllably deflectable mirrors, the optical signals received from the incoming fibers to the selected destination outgoing fibers;
detecting the position of optical signals beams incident on a first position sensitive detector array, the position of optical signals incident thereon corresponding to the position of the optical signals incident on the selected destination outgoing fibers in the second optical fiber array; and
controlling deflections of the plurality of controllably deflectable mirrors in the first mirror array in response to the determined destination outgoing fibers and in response to the detected positions of the optical signals.

53. A method for directing optical signals from incoming fibers in a first optical fiber array to selected destination outgoing fibers in a second optical fiber array, the method comprising:
determining the selected destination outgoing fibers;
reflecting, with a first mirror array comprising a plurality of controllably deflectable mirrors, the optical signals received from the incoming fibers to mirrors in a second mirror array comprising a plurality of controllably deflectable mirrors;
reflecting, with the second mirror array, the optical signals received from the first mirror array to the selected destination outgoing fibers in the second optical fiber array;
detecting positions of optical signal beams reflected from the first mirror array incident on a first position sensitive detector array, the;
detecting positions of optical signal beams reflected from the second mirror array incident on a second position sensitive detector array, the position of optical signals incident thereon corresponding to a position of the optical signals incident on the selected destination outgoing fibers in the second optical fiber array; and
controlling deflections of the plurality of controllably deflectable mirrors in the first mirror array and the second mirror array in response to the determined destination outgoing fibers and in response to the detected positions of the optical signal beams.

54. A method for directing optical signals from a first set of incoming fibers in a first optical fiber array to a first set of selected outgoing fibers in a second optical fiber array, and for directing optical signals from a second set of incoming fibers in the second optical fiber array to a second set of selected outgoing fibers in the first optical fiber array, the method comprising:
determining the first set of selected outgoing fibers;
reflecting, with a first mirror array comprising a plurality of controllably deflectable mirrors, the optical signals received from the first set of incoming fibers to mirrors in a second mirror array comprising a plurality of controllably deflectable mirrors;
reflecting, with the second mirror array, the optical signals received from the first mirror array to the first set of selected outgoing fibers in the second optical fiber array;
detecting the position of optical signal beams incident on a first position sensitive detector array, the position of optical signals incident thereon corresponding to a position of the optical signals incident on the first set of selected outgoing fibers in the second optical fiber array;
controlling deflections of the plurality of controllably deflectable mirrors in the first mirror array and the second mirror array in response to the determined first set of selected outgoing fibers and in response to the detected positions of the optical signals on the first position sensitive detector array;

determining the second set of selected outgoing fibers;

reflecting, with the second mirror array, the optical signals received from the second set of incoming fibers to mirrors in the first mirror array;

reflecting, with the first mirror array, the optical signals received from the second mirror array to the second set of selected outgoing fibers in the first optical fiber array;

detecting the position of optical signal beams incident on a second position sensitive detector array, the position of optical signals incident thereon corresponding to a position of the optical signals incident on the second set of selected outgoing fibers in the first optical fiber array; and controlling deflections of the plurality of controllably deflectable mirrors in the first mirror array and the second mirror array in response to the determined second set of selected outgoing fibers and in response to the detected positions of the optical signals incident on the second position sensitive detector array.

55. The method of claim 54 further comprising detecting the light intensities in the first set of selected outgoing fibers in the second optical fiber array, wherein the deflections of the plurality of controllably deflectable mirrors in the first mirror array and the second mirror array are further controlled in response to the light intensities in the first set of selected outgoing fibers in the second optical fiber array.

56. The method of claim 55 wherein the deflections of the plurality of controllably deflectable mirrors in the first mirror array and the second mirror array are controlled to maximize the light intensities in the first set of selected outgoing fibers in the second optical fiber array.

57. The method of claim 54 further comprising detecting the light intensities in the second set of selected outgoing fibers in the first optical fiber array, wherein the deflections of the plurality of controllably deflectable mirrors in the first mirror array and the second mirror array are further controlled in response to the light intensities in the second set of selected outgoing fibers in the first optical fiber array.

58. The method of claim 57 wherein the deflections of the plurality of controllably deflectable mirrors in the first mirror array and the second mirror array are controlled to maximize the light intensities in the second set of selected outgoing fibers in the first optical fiber array.

59. A method for directing optical signals from incoming fibers in a first optical fiber array to selected destination outgoing fibers in a second optical fiber array, the method comprising:

determining, for each incoming fiber, the selected destination outgoing fiber;

determining, for each incoming fiber, an optical path from the incoming fiber to at least one mirror array comprising a plurality of controllably deflectable mirrors, and to the selected destination outgoing fiber;

detecting the position of optical signal beams incident on a first position sensitive detector array, the position of optical signals incident thereon corresponding to a position of the optical signals incident on the selected destination outgoing fibers in the second optical fiber array; and controlling deflections of the plurality of controllably deflectable mirrors in the at least one mirror array in response to the determined destination outgoing fibers, the determined optical path and in response to the detected positions of the optical signals to direct the optical signals from the incoming fibers to the selected destination outgoing fibers.

60. The method of claim 59, further comprising:

determining, for at least one incoming fiber, a new selected destination outgoing fiber;

determining, for the at least one incoming fiber, a new optical path from the at least one incoming fiber to the at least one mirror array comprising a plurality of controllably deflectable mirrors, and to the selected destination outgoing fiber;

detecting the position of an optical signal beam from the at least one incoming fiber incident on the first position sensitive detector array, the position of the optical signal from the at least one incoming fiber incident thereon corresponding to a position of the optical signal incident on the new selected destination outgoing fiber; and controlling deflections of at least one of the plurality of controllably deflectable mirrors in the at least one mirror array in response to the determined new destination outgoing fiber, the determined new optical path and in response to the detected position of the optical signals to direct the optical signal from the at least one incoming fiber to the new selected destination outgoing fiber without redirecting the optical signals from the rest of the incoming fibers.

61. The method of claim 59, further comprising:

determining, for at least one incoming fiber, a new selected destination outgoing fiber;

determining, for the at least one incoming fiber, a new optical path from the at least one incoming fiber to the at least one mirror array comprising a plurality of controllably deflectable mirrors, and to the selected destination outgoing fiber;

detecting the position of an optical signal beam from the at least one incoming fiber incident on the first position sensitive detector array, the position of the optical signal from the at least one incoming fiber incident thereon corresponding to a position of the optical signal incident on the new selected destination outgoing fiber; and controlling deflections of at least one of the plurality of controllably deflectable mirrors in the at least one mirror array in response to the determined new destination outgoing fiber, the determined new optical path and in response to the detected position of the optical signals to direct the optical signal from the at least one incoming fiber to close proximity to the new selected destination outgoing fiber without redirecting the optical signals from the rest of the incoming fibers.

* * * * *